United States Patent
Sano et al.

(10) Patent No.: US 6,430,012 B1
(45) Date of Patent: Aug. 6, 2002

(54) MAGNETORESISTANCE EFFECT FILM AND MAGNETORESISTANCE EFFECT TYPE HEAD HAVING SPECIFIED ANTIFERROMAGNETIC PROMOTE LAYER

(75) Inventors: Masashi Sano; Yoshihiro Tsuchiya; Satoru Araki, all of Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/259,327

(22) Filed: Mar. 2, 1999

(30) Foreign Application Priority Data

Mar. 12, 1998 (JP) .......................... 10-080409
Jul. 23, 1998 (JP) .......................... 10-223652

(51) Int. Cl.$^7$ ............................................. G11B 5/39
(52) U.S. Cl. .............................. 360/324.1; 324/207.21; 324/252; 338/32 R
(58) Field of Search ............................. 360/113, 324, 360/324.1; 324/207.21, 252; 338/32 R

(56) References Cited

U.S. PATENT DOCUMENTS

| | | | |
|---|---|---|---|
| 5,341,118 A | * 8/1994 | Parkin et al. | 338/32 R |
| 5,475,304 A | * 12/1995 | Prinz | 324/207.21 |
| 5,549,978 A | * 8/1996 | Iwasaki et al. | 360/324 |
| 5,608,593 A | 3/1997 | Kim et al. | 360/113 |
| 5,793,279 A | * 8/1998 | Nepela | 338/32 R |
| 5,849,422 A | * 12/1998 | Hayashi | 428/611 |
| 5,862,022 A | 1/1999 | Noguchi et al. | 360/113 |
| 6,157,524 A | * 12/2000 | Nakazawa et al. | 360/324.12 |

FOREIGN PATENT DOCUMENTS

JP 9-63021 3/1997

* cited by examiner

Primary Examiner—Brian E. Miller
(74) Attorney, Agent, or Firm—Oblon, Spivak, McClelland, Maier & Neustadt, P.C.

(57) ABSTRACT

In a spin valve type magnetoresistance effect film, an antiferromagnetization promote layer is formed on a surface of an antiferromagnetic layer remote from a surface thereof abutting a ferromagnetic layer. The antiferromagnetic layer is made of a compound containing Mn and having a CuAu—I type regular crystal structure. The antiferromagnetic layer has a characteristic requiring a heat treatment for generating the exchange coupling relative to the ferromagnetic layer. The antiferromagnetic layer after the heat treatment is oriented on the (111) crystal orientation surface. The ratio Lp/La of a lattice constant Lp in the closest packed surface of the antiferromagnetization promote layer relative to a lattice constant La in the (111) crystal orientation surface of the antiferromagnetic layer is in the range of 0.9 to 1.1. Accordingly, the regulating temperature of the antiferromagnetic layer can be lowered so that the exchange coupling to the ferromagnetic layer can be generated at a heat treatment temperature as low as possible (for example, no higher than 250° C.). The thus obtained spin valve film is subjected to only quite small deterioration of spin valve film characteristics (for example, MR ratio).

17 Claims, 11 Drawing Sheets

MAGNETORESISTANCE EFFECT FILM AND MAGNETORESISTANCE EFFECT TYPE HEAD HAVING SPECIFIED ANTIFERROMAGNETIC PROMOTE LAYER

BACKGROUND OF THE INVENTION

1. Field of the Invention

The present invention relates to a magnetoresistance effect film for reading the magnetic field intensity of a magnetic recording medium or the like as a signal and, in particular, to a magnetoresistance effect film which is capable of reading a small magnetic field change as a greater electrical resistance change signal, and further relates to a magnetoresistance effect type head using such a magnetoresistance effect film. They are mainly incorporated in, for example, hard disk drives so as to be used.

2. Description of the Prior Art

Recently, following the high densification of hard disks, highly-sensitive heads with high outputs have been demanded. In response to these demands, spin valve heads have been developed.

The spin valve head has a structure wherein two ferromagnetic layers are formed via a non-magnetic metal layer, and an antiferromagnetic layer is disposed so as to abut one of the ferromagnetic layers. The ferromagnetic layer abutting the antiferromagnetic layer is in exchange coupling to the antiferromagnetic layer so that the magnetization of the ferromagnetic layer is fixed (pinned) in one direction. The magnetization of the other ferromagnetic layer is freely rotated following the change of the external magnetic field. In the spin valve, the MR change is realized by a difference in relative angles of spins between the two ferromagnetic layers. Therefore, the exchange coupling between the antiferromagnetic layer and the ferromagnetic layer abutting thereto can be said to be the substance of the spin valve.

As a material of an antiferromagnetic layer used in the spin valve, FeMn, NiMn, PtMn or the like has been well known.

When FeMn is used as the antiferromagnetic layer, the exchange coupling is generated relative to the ferromagnetic layer immediately after the formation of a film. Thus, a heat treatment for generating the exchange coupling is not required after the film formation. However, there is raised a limitation in order of the film formation that the antiferromagnetic layer should be formed after the formation of the ferromagnetic layer. Further, when FeMn is used, there is a problem that a blocking temperature is low, i.e. about 150 to 170° C. The blocking temperature is a temperature at which the exchange coupling pinning a magnetic layer is lost.

On the other hand, when NiMn or PtMn is used as the antiferromagnetic layer, the blocking temperature is high, i.e. no lower than 300° C., and further, there is no limitation in order of the formation of the antiferromagnetic layer and the ferromagnetic layer. However, for generating the exchange coupling between the antiferromagnetic layer and the ferromagnetic layer, a heat treatment is required in the magnetic field after stacking both layers. This is because, for NiMn or PtMn to exhibit the antiferromagnetism, a CuAu—I type regular crystal structure having a face centered tetragonal (FCT) structure needs to be formed. The heat treatment in the magnetic field is normally carried out under a temperature condition of 250 to 350° C. The degree of exchange coupling tends to be increased as the temperature is raised. However, if the heat treatment at high temperatures is applied to the spin valve film, a magnetoresistance change ratio (MR ratio) being an important film characteristic of the spin valve film is lowered. Therefore, it is desired that the heat treatment for generating the exchange coupling between the antiferromagnetic layer and the ferromagnetic layer abutting thereto be carried out at a temperature as low as possible which can achieve the exchange coupling to a given level.

The present invention has been made under these circumstances and has an object to provide a magnetoresistance effect film and a magnetoresistance effect type head which, when NiMn or PtMn is used as an antiferromagnetic layer, can lower the regulating temperature of the antiferromagnetic layer to generate the exchange coupling at a heat treatment temperature as low as possible (for example, no higher than 250° C.) so that a spin valve film characteristic (for example, MR ratio) is not adversely affected.

As the prior art literature relevant to the present invention, there are U.S. Pat. No. 5,608,593 and JP-A-9-63021.

U.S. Pat. No. 5,608,593 discloses a spin valve film having a structure wherein a buffer layer made of Cu or NiCr, an antiferromagnetic layer made of FeMn, NiMn or NiCoO and a ferromagnetic layer pinned by the antiferromagnetic layer are formed in the order named on an underlayer formed on a substrate. The buffer layer is described to have an adequate microstructure and functions of promoting a phase of the antiferromagnetic layer and preventing mutual diffusion between the underlayer and the antiferromagnetic layer. However, only by a simple combination of the buffer layer made of Cu and the antiferromagnetic layer made of NiMn, the foregoing object of the present invention can not be accomplished to a sufficient level. Specifically, there is a problem that a temperature for regulating crystals is not lowered so much.

On the other hand, JP-A-9-63021 discloses a spin valve film having a structure wherein a film obtained by stacking Ta and NiFe is used as an underlayer, and an antiferromagnetic layer made of NiMn and a ferromagnetic layer pinned by the antiferromagnetic layer are formed in the order named on the underlayer. It is described that Ta of the underlayer is used for smoothing the surface, while NiFe of the underlayer is used for allowing NiMn to easily form an FCT structure. However, if the underlayer made of NiFe is used, there is raised a disadvantage that this ferromagnetic body exerts a magnetically bad influence on the spin valve film.

SUMMARY OF THE INVENTION

For solving the foregoing problems, according to one aspect of the present invention, there is provided a spin valve type magnetoresistance effect film comprising a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from a surface thereof abutting the non-magnetic metal layer so as to pin a direction of magnetization of the ferromagnetic layer, and an antiferromagnetization promote layer formed on a surface of the antiferromagnetic layer remote from a surface thereof abutting the ferromagnetic layer, wherein the antiferromagnetic layer is made of a compound containing Mn and having a CuAu—I type regular crystal structure, the antiferromagnetic layer has a characteristic requiring a heat treatment for generating exchange coupling relative to the ferromagnetic layer, and the antiferromagnetic layer after the heat treatment is oriented on a (111) crystal orientation surface, and wherein a ratio Lp/La of a lattice constant Lp in a closest packed surface of the antiferromagnetization promote layer relative to a lattice constant La in the (111) crystal orientation surface of the antiferromagnetic layer is in the range of 0.9 to 1.1.

It is preferable that the antiferromagnetic layer oriented on the (111) crystal orientation surface is made of PtMn or an alloy containing PtMn at least no less than 80 at %, and that the antiferromagnetization promote layer is made of at least one selected from Ir, Pd, Pt, Rh, Ru, Re, Os, Al, Cu, Au and Ag.

It is preferable that the antiferromagnetization promote layer is made of at least one selected from Pd, Pt, Rh and Re.

It is preferable that the antiferromagnetic layer oriented on the (111) crystal orientation surface is made of NiMn or an alloy containing NiMn at least no less than 80 at %, and that the antiferromagnetization promote layer is made of at least one selected from Ir, Pd, Pt, Rh, Ru, Re and Os.

It is preferable that the antiferromagnetization promote layer is made of at least one selected from Ir, Pd and Rh.

It is preferable that a thickness of the antiferromagnetization promote layer is 0.1 to 10 nm.

It is preferable that a laminate structure is formed by the antiferromagnetization promote layer, the antiferromagnetic layer, the ferromagnetic layer, the non-magnetic metal layer and the soft magnetic layer which are stacked in the order named on a substrate directly or via an underlayer.

It is preferable that a laminate structure is formed by the antiferromagnetization promote layer, the antiferromagnetic layer, the ferromagnetic layer, the non-magnetic metal layer and the soft magnetic layer which are stacked in the order named on an underlayer formed on a substrate, and that the underlayer is made of at least one selected from Ta, Hf, Zr and Ti.

According to another aspect of the present invention, there is provided a magnetoresistance effect type head comprising a magnetoresistance effect film, conductive films and electrode portions, wherein the conductive films are conductively connected to the magnetoresistance effect film through the electrode portions, wherein the magnetoresistance effect film is a spin valve type magnetoresistance effect film which comprises a multilayered film including a non-magnetic metal layer, a ferromagnetic layer formed on one surface of the non-magnetic metal layer, a soft magnetic layer formed on the other surface of the non-magnetic metal layer, an antiferromagnetic layer which is formed on a surface of the ferromagnetic layer remote from a surface thereof abutting the non-magnetic metal layer so as to pin a direction of magnetization of the ferromagnetic layer, and an antiferromagnetization promote layer formed on a surface of the antiferromagnetic layer remote from a surface thereof abutting the ferromagnetic layer, wherein the antiferromagnetic layer is made of a compound containing Mn and having a CuAu—I type regular crystal structure, the antiferromagnetic layer has a characteristic requiring a heat treatment for generating exchange coupling relative to the ferromagnetic layer, and the antiferromagnetic layer after the heat treatment is oriented on a (111) crystal orientation surface, and wherein a ratio Lp/La of a lattice constant Lp in a closest packed surface of the antiferromagnetization promote layer relative to a lattice constant La in the (111) crystal orientation surface of the antiferromagnetic layer is in the range of 0.9 to 1.1.

It is preferable that the antiferromagnetic layer oriented on the (111) crystal orientation surface is made of PtMn or an alloy containing PtMn at least no less than 80 at %, and that the antiferromagnetization promote layer is made of at least one selected from Ir, Pd, Pt, Rh, Ru, Re, Os, Al, Cu, Au and Ag.

It is preferable that the antiferromagnetization promote layer is made of at least one selected from Pd, Pt, Rh and Re.

It is preferable that the antiferromagnetic layer oriented on the (111) crystal orientation surface is made of NiMn or an alloy containing NiMn at least no less than 80 at %, and that the antiferromagnetization promote layer is made of at least one selected from Ir, Pd, Pt, Rh, Ru, Re and Os.

It is preferable that the antiferromagnetization promote layer is made of at least one selected from Ir, Pd and Rh.

It is preferable that a thickness of the antiferromagnetization promote layer is 0.1 to 10 nm.

It is preferable that the magnetoresistance effect film comprises a laminate structure formed by the antiferromagnetization promote layer, the antiferromagnetic layer, the ferromagnetic layer, the non-magnetic metal layer and the soft magnetic layer which are stacked in the order named on a substrate directly or via an underlayer.

It is preferable that the magnetoresistance effect film comprises a laminate structure formed by the antiferromagnetization promote layer, the antiferromagnetic layer, the ferromagnetic layer, the non-magnetic metal layer and the soft magnetic layer which are stacked in the order named on an underlayer formed on a substrate, and that the under layer is made of at least one selected from Ta, Hf, Zr and Ti.

DETAILED DESCRIPTION OF THE INVENTION

Hereinbelow, the concrete carrying-out modes of the present invention will be described in detail.

Figure 1:
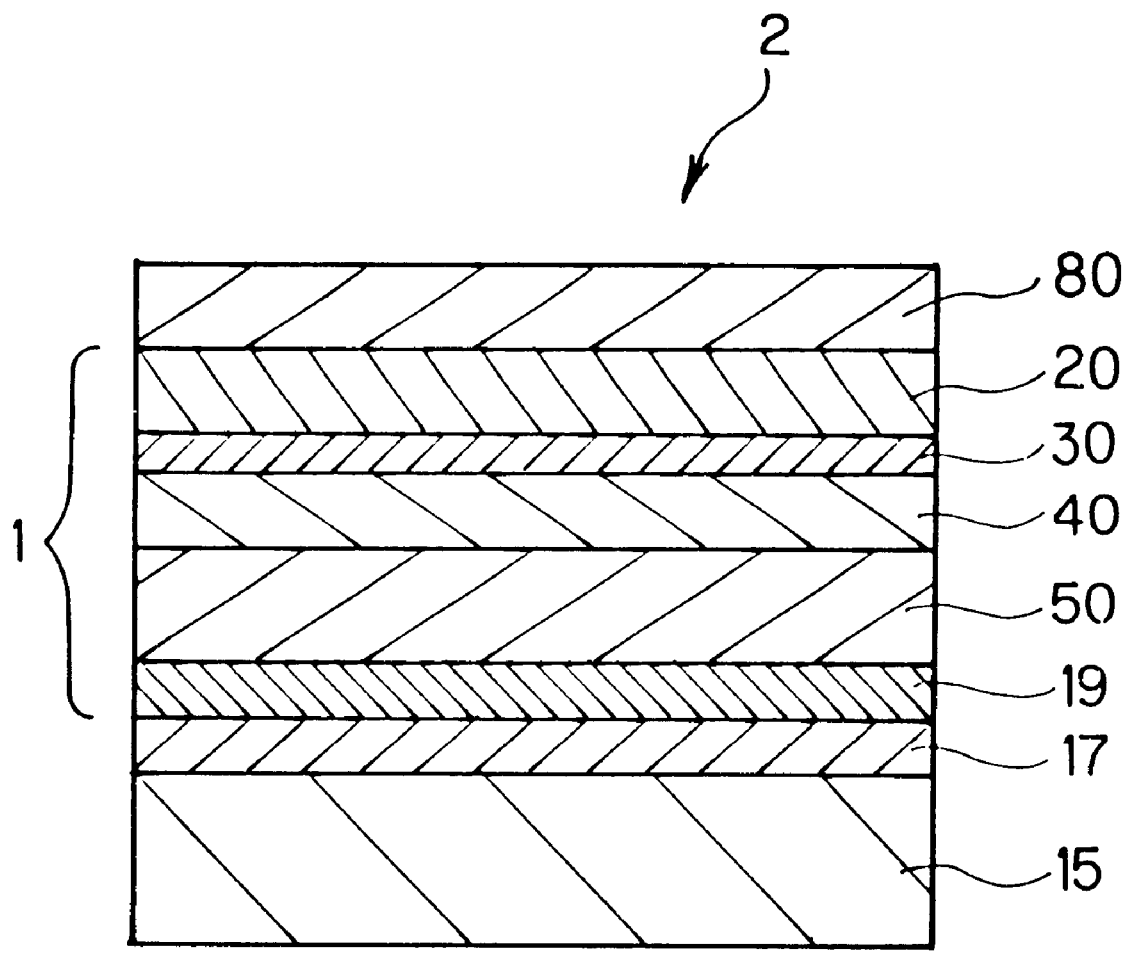
FIG. 1 is a sectional view showing a magnetoresistance effect film according to the present invention.

FIG. 1 is a sectional view showing a preferred example of a magnetoresistance effect film 2. In this carrying-out mode, the magnetoresistance effect film 2 has a magnetic multi-layered film 1 as a spin valve film showing a giant magnetoresistance effect.

As shown in FIG. 1, the magnetic multilayered film 1 has a laminate body structure which comprises a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40, and an antiferromagnetization promote layer 19 which is formed on a surface of the antiferromagnetic layer 50 remote from the other surface thereof abutting the ferromagnetic layer 40.

In the preferred carrying-out mode shown in FIG. 1, the laminate body is formed on a substrate 15, and they are laminated from the side of the substrate 15 via an under layer 17 in the order of the antiferromagnetization promote layer 19, the antiferromagnetic layer 50, the ferromagnetic layer 40, the non-magnetic metal layer 30 and the soft magnetic layer 20. As shown in the drawing, a protective layer 80 is further formed on the soft magnetic layer 20.

In the magnetic multilayered film 1 (spin valve film) according to this carrying-out mode, it is required that the soft magnetic layer 20 and the ferromagnetic layer 40 which are adjacently formed at both sides of the non-magnetic metal layer 30 have substantially different magnetization directions from each other in accordance with a signal magnetic field applied from the external. The reason is as follows: In the principle of the present invention, when the magnetization directions of the soft magnetic layer 20 and the ferromagnetic layer 40 which are formed via the non-magnetic metal layer 30 interposed therebetween are deviated from each other, conduction electrons have a behavior of scattering due to spins to increase its resistance. In this case, when the magnetization directions are opposite to each other, the maximum resistance is obtained. That is, in this invention, when a signal magnetic field from the external is positive (in an upward direction with respect to a recording surface 93 of a recording medium 90 (represented by reference numeral 92)) as shown in FIG. 2, there occur mutually opposite components in the magnetization directions of the neighboring magnetic layers so that the resistance is increased.

Here, the relationship among the external signal magnetic field from the magnetic recording medium, the magnetization directions of the soft magnetic layer 20 and the ferromagnetic layer 40 and the variation of electrical resistance in the (spin valve) magnetic multilayered film used in the magnetoresistance effect film of the present invention will be described.

Now, in order to facilitate the understanding of the present invention, the simplest magnetic multilayered film in which the pair of soft magnetic layer 20 and ferromagnetic layer 40 exist via the non-magnetic metal layer 30 as shown in FIG. 1 will be described with reference to FIG. 2.

Figure 2:
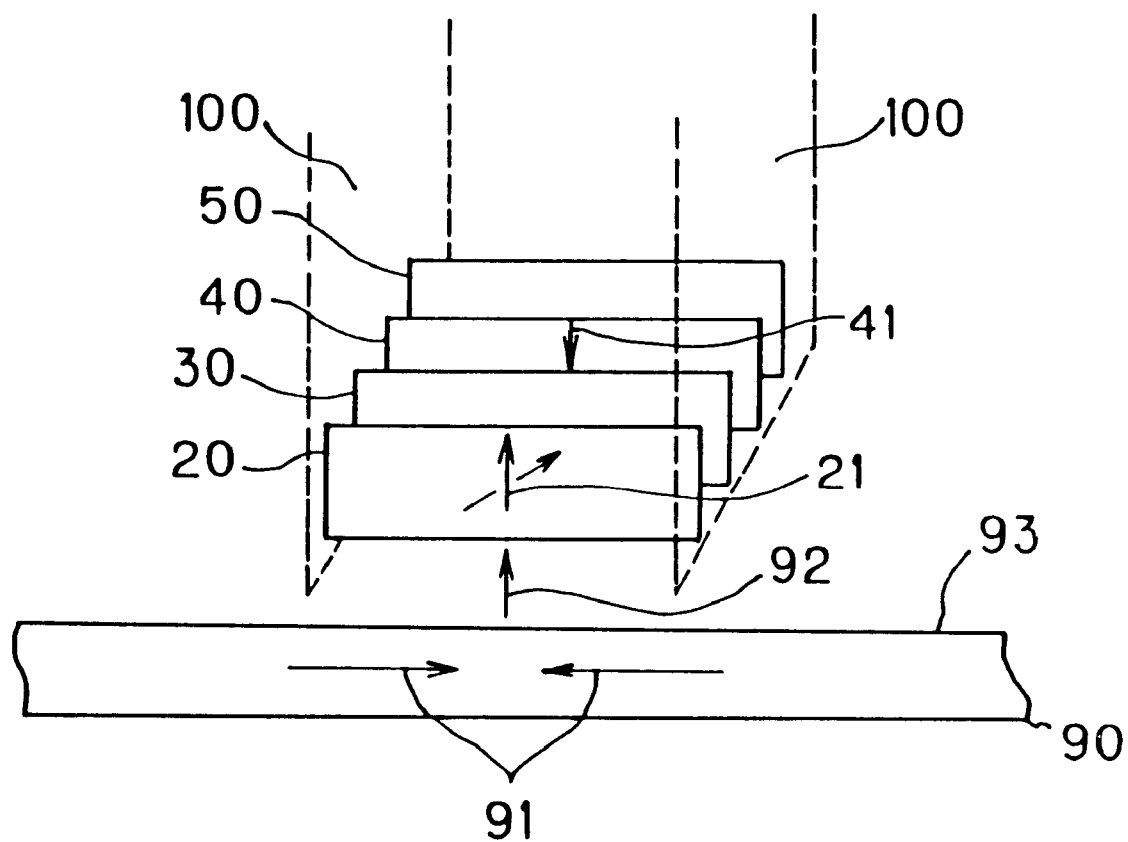
FIG. 2 is a schematic diagram showing a magnetoresistance effect film, particularly, a structure of a magnetic multilayered film, for explaining an operation of the present invention.

As shown in FIG. 2, the magnetization of the ferromagnetic layer 40 is pinned in a downward direction to the surface of the recording medium by a method as described later (see reference numeral 41). The soft magnetic layer 20 is formed via the non-magnetic metal layer 30 so that the magnetization direction thereof is varied in accordance with the signal magnetic field from the external (see reference numeral 21). At this time, the relative angle between the magnetization directions of the soft magnetic layer 20 and the ferromagnetic layer 40 is greatly varied in accordance with the direction of the signal magnetic field from the magnetic recording medium 90. As a result, the scattering degree of the conduction electrons flowing in the magnetic layers is varied, and thus the electrical resistance is greatly varied.

Accordingly, a large MR (Magneto-Resistance) effect, which essentially differs in mechanism from the anisotropic magnetoresistance effect of Permalloy, can be obtained. This is particularly called a GMR (Giant-Magneto-Resistance) effect.

Figure 3:
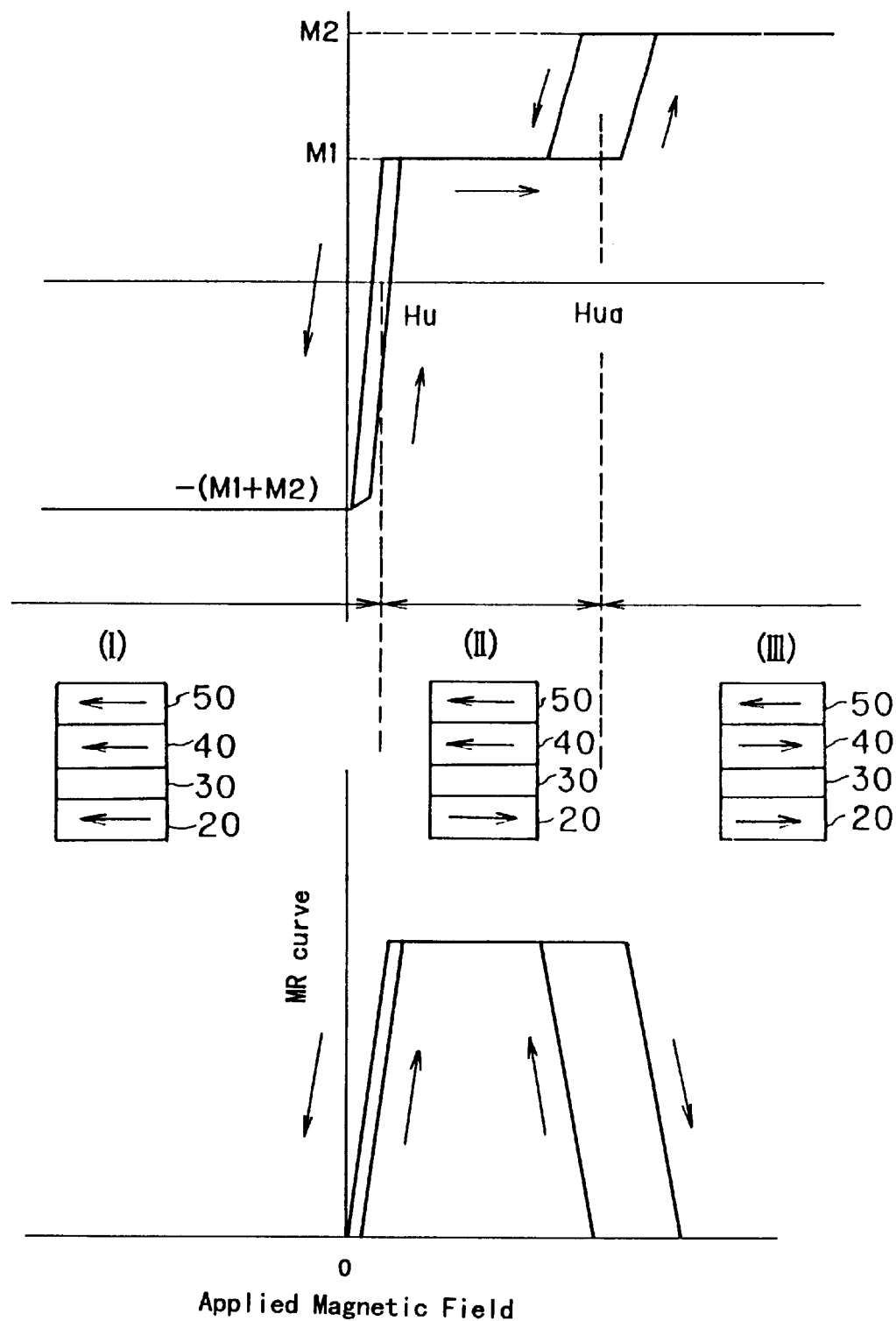
FIG. 3 is a schematic diagram showing a magnetization curve and an MR curve for explaining an operation of the present invention.

The magnetization directions of the soft magnetic layer 20, the ferromagnetic layer 40 and the antiferromagnetic layer 50 exhibiting a pinning effect are varied relative to the external magnetic field. The variation of the magnetization directions thereof is shown in FIG. 3 in correspondence with the magnetization curve and the MR curve. In this case, all the magnetization of the ferromagnetic layer 40 is fixed in a minus direction (in a downward direction with respect to the recording surface of the recording medium 90) by the antiferromagnetic layer 50. When the external signal magnetic field is minus, the magnetization of the soft magnetic layer 20 is also in the minus direction. Now, it is assumed that the coercive force of each of the soft magnetic layer 20 and the ferromagnetic layer 40 is approximate to zero in order to simplify the description. In an area (I) where the signal magnetic field H<0, the magnetization of both the soft magnetic layer 20 and the ferromagnetic layer 40 is oriented in one direction.

When the external magnetic field is intensified and H exceeds the coercive force of the soft magnetic layer 20, the magnetization direction of the soft magnetic layer is rotated in the direction of the signal magnetic field, so that the magnetization and the electrical resistance are increased as the magnetization directions of the soft magnetic layer 20 and the ferromagnetic layer 40 become antiparallel to each other. Finally, these values are fixed (state of an area (II)). At this time, a pinning magnetic field Hua is applied by the antiferromagnetic layer 50. If the signal magnetic field exceeds Hua, the magnetization of the ferromagnetic layer 40 is also rotated in the direction of the signal magnetic field, so that the magnetization of each of the soft magnetic layer 20 and the ferromagnetic layer 40 is oriented in the same direction in an area (III). At this time, the magnetization is set to a constant value, and the MR curve is equal to zero.

Conversely, when the signal magnetic field H is reduced, the magnetization is changed from the area (III) through the area (II) to the area (I) by inversion of the magnetization of the soft magnetic layer 20 and the ferromagnetic layer 40 in the same manner as described above. At an initial portion of the area (II), conduction electrons have a behavior of scattering dependent on spins, and the resistance is increased. In the area (II), the ferromagnetic layer 40 has little magnetization inversion because it is pinned, while the magnetization of the soft magnetic layer 20 increases linearly, so that the rate of spin-dependent scattered conduction electrons is gradually increased in accordance with the magnetization change of the soft magnetic layer 20. That is, if $Ni_{0.8}Fe_{0.2}$ whose Hc is low is selected for the soft magnetic layer 20 and a suitable unidirectional anisotropic magnetic field Hk is applied, a formed magnetic multilayered film has a linearly-varying resistance and a large magnetoresistance ratio in a small external magnetic field of several Oe to several tens Oe below Hk.

Hereinbelow, each constitution of the foregoing magnetoresistance effect film 2 will be described in detail. The first feature of this magnetoresistance effect film resides in a combination of a material constituting the antiferromagnetic layer 50 and a material constituting the antiferromagnetization promote layer 19 formed on a surface of the antiferromagnetic layer 50 remote from a surface thereof abutting the ferromagnetic layer 40.

Specifically, in the present invention, the antiferromagnetic layer 50 is made of a compound containing Mn and having a CuAu—I type regular crystal structure. Further, the antiferromagnetic layer 50 has a characteristic requiring a heat treatment for generating the exchange coupling relative to the ferromagnetic layer 40. The CuAu—I type regular crystal structure is described in "Magnetic Body Handbook (Asakura Bookstore), pp. 401 to 403" and defined as, for example, a crystal structure of PtMn, NiMn or PdMn.

The antiferromagnetic layer 50 may be made of PtMn, NiMn or PdMn, preferably PtMn or NiMn, more preferably PtMn because greater exchange coupling energy Jk can be obtained.

Further, the PtMn antiferromagnetic layer 50 may be made of an alloy containing PtMn no less than 80 at %. As a preferred PtMn material, $Pt_{x1}M_{y1}Mn_{z1}$ can be cited wherein M represents at least one selected from Ru, Rh, Pd, Au, Ag, Fe and Cr, preferably Ru or Rh. The range of x1 is set to $30 \leq x1 \leq 60$, the range of y1 is set to $0 \leq y1 \leq 30$, the range of z1 is set to $40 \leq z1 \leq 60$, and the unit of x1, y1 and z1 is atomic %.

Further, the NiMn antiferromagnetic layer 50 may be made of an alloy containing NiMn no less than 80 at %. As a preferred PtMn material, $Ni_{x2}M_{y2}Mn_{z2}$ can be cited wherein M represents at least one selected from Ru, Rh, Pd, Pt, Au, Ag, fe and Cr, preferably Ru, Rh or Pd. The range of x2 is set to $30 \leq x2 \leq 60$, the range of y2 is set to $0 \leq y2 \leq 30$, the range of z2 is set to $40 \leq z2 \leq 60$, and the unit of x2 y2 and z2 is atomic %.

On the premise of the presence of the later-described antiferromagnetization promote layer 19, the antiferromagnetic layer 50 is subjected to a heat treatment for generating the exchange coupling relative to the ferromagnetic layer 40. Through the heat treatment, the regular crystals forming the antiferromagnetic layer 50 need to be oriented on the (111) crystal orientation surface. If the orientation of the antiferromagnetic layer 50 on the (111) crystal orientation surface is not achieved, there is raised a disadvantage that the regulating temperature of the antiferromagnetic layer is not lowered so much.

As the antiferromagnetization promote layer 19, Ir, Pd, Pt, Rh, Ru, Re, Os, Al, Cu, Au or Ag, for example, can be used. However, upon selection of the antiferromagnetization promote layer 19, it is necessary that a ratio Lp/La, i.e. a ratio of a lattice constant Lp in the closest packed surface of the antiferromagnetization promote layer 19 relative to a lattice constant La in the (111) crystal orientation surface of the antiferromagnetic layer 50, is in the range of 0.9 to 1.1, more preferably in the range of 0.97 to 1.07. If the ratio becomes less than 0.9 or greater than 1.1, there is raised a disadvantage that the effect of providing the promote layer is not revealed so that the regulating temperature can not be lowered.

In the present invention, a material of the antiferromagnetization promote layer 19 is selected which satisfies the foregoing condition relative to a material of the antiferromagnetic layer 50. By providing the antiferromagnetization promote layer 19 satisfying the given condition of the present invention, the exchange coupling between the antiferromagnetic layer 50 and the ferromagnetic layer 40 can be accomplished at a relatively low heat treatment temperature (for example, no higher than 250° C., particularly, 220 to 250° C).

Hereinbelow, how to select a concrete material of the antiferromagnetization promote layer 19 will be described in detail in each of cases where PtMn (including an alloy containing PtMn no less than 80 at %) is used as a preferred material of the antiferromagnetic layer 50 and NiMn (including an alloy containing NiMn no less than 80 at %) is used as a preferred material of the antiferromagnetic layer 50.

(1) In Case of Using PtMn as Antiferromagnetic Layer 50

The composition ratio (atomic %) of PtMn used as the antiferromagnetic layer 50 is normally such that Mn is set to 40 to 60 at %. If the Mn content deviates from this range, the regular crystal structure can not be formed in general so as not to reveal the antiferromagnetism.

When PtMn is used as the antiferromagnetic layer 50, the antiferromagnetization promote layer 19 is made of at least one selected from Ir, Pd, Pt, Rh, Ru, Re, Os, Al, Cu, Au and Ag.

The lattice constant Lp in the closest packed surface of the thus selected antiferromagnetization promote layer 19 satisfies the condition relative to the lattice constant La in the (111) crystal orientation surface of the PtMn antiferromagnetic layer (in this case, La=2.72 Å) that the ratio Lp/La is in the range of 0.9 to 1.1. Among the foregoing elements, Pt, Pd, Rh and Re are preferable, and Pt and Pd are the most preferable. The antiferromagnetization promote layer 19 may be made of an alloy containing at least one of the foregoing elements, preferably PtRh or NiRh, particularly PtRh, for example.

The thickness of the antiferromagnetization promote layer 19 is set to 0.1 to 10 nm, preferably 1 to 10 nm, more preferably 2 to 5 nm. If the thickness becomes less than 0.1 nm, the effect of the antiferromagnetization promote layer 19 itself is not revealed. On the other hand, if the thickness exceeds 10 nm so as to be too thick, there is raised a disadvantage that the electrical resistance of the antiferromagnetization promote layer 19 is reduced to allow an unwanted sense current to flow in this portion so that the output is lowered.

(2) In Case of Using NiMn as Antiferromagnetic Layer 50

The composition ratio (atomic %) of NiMn used as the antiferromagnetic layer 50 is normally such that Mn is set to 40 to 60 at %. If the Mn content deviates from this range, the regular crystal structure can not be formed in general so as not to reveal the antiferromagnetism.

When NiMn is used as the antiferromagnetic layer 50, the antiferromagnetization promote layer 19 is made of at least one selected from Ir, Pd, Pt, Rh, Ru, Re and Os.

The lattice constant Lp in the closest packed surface of the thus selected antiferromagnetization promote layer 19 satisfies the condition relative to the lattice constant La in the (111) crystal orientation surface of the NiMn antiferromagnetic layer (in this case, La=2.57 Å) that the ratio Lp/La is in the range of 0.9 to 1.1. Among the foregoing elements, Pd, Ir and Rh are preferable materials, and Rh and Pd are the most preferable materials. The antiferromagnetization promote layer 19 may be made of an alloy containing at least one of the foregoing elements, preferably PtRh or NiRh, particularly PtRh, for example.

Like the foregoing case (1), the thickness of the antiferromagnetization promote layer 19 is set to 0.1 to 10 nm, preferably 1 to 10 nm, more preferably 2 to 5 nm. If the thickness becomes less than 0.1 nm, the effect of the antiferromagnetization promote layer 19 itself is not revealed. On the other hand, if the thickness exceeds 10 nm so as to be too thick, there is raised a disadvantage that the electrical resistance of the antiferromagnetization promote layer 19 is reduced to allow an unwanted sense current to flow in this portion so that the output is lowered.

The thickness of the antiferromagnetic layer 50 is set to 5 to 100 nm, preferably 5 to 80 nm, more preferably 5 to 50 nm, still more preferably 5 to 30 nm. If the thickness of the antiferromagnetic layer 50 becomes smaller than 5 nm, the exchange coupling magnetic field Hua and the blocking temperature Tb are rapidly reduced. On the other hand, in case of being thicker, it is not so serious. However, if it is too thick, a gap length (a shield-shield length) of the MR head is so increased that it is not suitable for the ultrahigh density magnetic recording. Thus, it is preferably less than 100 nm.

The ferromagnetic layer 40 is formed of a metal element such as Fe, Ni, Co, Mn, Cr, Dy, Er, Nd, Tb, Tm, Ce, Gd, alloy or compound containing the above metal element. Particularly, it is preferably formed of a composition expressed by $(Co_zNi_{1-z})_wFe_{1-w}$ ($0.4 \leq z \leq 1.0$, $0.5 \leq w \leq 1.0$ by weight) Out of the composition range as described above, no large electrical resistance change can be obtained.

The thickness of the ferromagnetic layer 40 as described above is set to 1.6 to 10 nm, and more preferably 2 to 6 nm. If this value is smaller than 1.6 nm, it loses the characteristic as the ferromagnetic layer. On the other hand, if the value exceeds 10 nm, the pinning force of the antiferromagnetic layer 50 is reduced, and thus the sufficient pinning effect of the spin of the ferromagnetic layer can not be obtained.

As described above, since the ferromagnetic layer 40 is in direct abutment with the antiferromagnetic layer 50, a direct interlayer interaction acts on each other after a heat treatment at a given temperature, and the rotation of the magnetization of the ferromagnetic layer 40 is prevented. On the other hand, with respect to the soft magnetic layer 20 as described later in detail, its magnetization can be freely rotated by a signal magnetic field from outside. As a result, a relative angle is produced in magnetization between the soft magnetic layer 20 and the ferromagnetic layer 40, so that a large MR effect due to the difference between the magnetization directions can be obtained.

The soft magnetic layer 20 is formed of Fe, Ni, Co or the like revealing soft magnetic characteristics, or alloy or compound containing these elements. The MR curve rises up more sharply by using the magnetic layer having a small coercive force Hc, and a favorable effect can be obtained. It is particularly preferable that the soft magnetic layer 20 has the following two-layer structure. Specifically, the soft magnetic layer 20 is formed as a two-layer laminate body comprising, from the side of the non-magnetic layer 30, a first soft magnetic layer and a second soft magnetic layer. The first soft magnetic layer is made of a simple substance of Co (cobalt) or an alloy containing Co no less than 80 weight %. The second soft magnetic layer has a composition expressed by $(Ni_xFe_{1-x})_yCo_{1-y}$ ($0.7 \leq x \leq 0.9$, $0.5 \leq y \leq 1.0$ by weight). With this arrangement, the first soft magnetic layer with Co being rich works as a diffusion blocking layer so as to prevent diffusion of Ni from the side of the second soft magnetic layer toward the non-magnetic metal layer 30. Further, since the first soft magnetic layer with Co being rich enhances the scattering of electrons, the MR ratio is improved. The second soft magnetic layer is formed within the foregoing composition range for maintaining the soft magnetic characteristic.

The thickness of the soft magnetic layer 20 as described above is set to 2 to 15 nm, preferably 3 to 15 nm, and more preferably 5 to 15 nm. If this value is smaller than 2 nm, no excellent characteristic as the soft magnetic layer can be obtained. On the other hand, if the value exceeds 15 nm, the total thickness of the multilayered film is large and the resistance of the whole magnetic multilayered film is increased, so that the MR effect is reduced. When the soft magnetic layer 20 is in the form of the foregoing two-layer laminate body, it is sufficient to set the thickness of the Co-rich first soft magnetic layer to be no less than 0.4 nm.

In order to conduct electrons efficiently, a metal having conductivity is preferably used for the non-magnetic metal layer which is interposed between the soft magnetic layer 20 and the ferromagnetic layer 40. More specifically, it may be formed of at least one selected from Au, Ag and Cu, alloy containing 60 weight % or more of at least one of these elements, or the like.

The thickness of the non-magnetic metal layer 30 is preferably set to 1.5 to 4 nm. If this value is smaller than 1.5 nm, the soft magnetic layer 20 and the ferromagnetic layer 40 which are disposed through the non-magnetic metal layer are exchange-coupled to each other, so that the spins of the soft magnetic layer 20 and the ferromagnetic layer 40 do not function independently of each other. If this value exceeds 4 nm, the rate of the electrons which are scattered at the interface between the soft magnetic layer 20 and the ferromagnetic layer 40 disposed at the upper and lower sides respectively is reduced, so that the MR ratio is reduced.

The protective layer 80 is normally provided to prevent oxidation of the surface of the magnetic multilayered film in a film-forming process and improve wettability with electrode material formed thereon and adhesive strength. The protective layer 80 is formed of Ti, Ta, W, Cr, Hf, Zr, Zn or the like. The thickness thereof is generally set to about 3 to 30 nm.

The substrate 15 is formed of glass, silicon, MgO, GaAs, ferrite, AlTiC, $CaTiO_3$ or the like, and the thickness thereof is generally set to about 0.5 to 10 mm.

The underlayer 17 is formed of Ta, Hf, Ti, Cr or Zr, preferably Ta, Hf, Ti or Zr. The thickness thereof is set to 1 to 20 nm, preferably 1 to 10 nm, more preferably 1 to 5 nm. Although a smaller thickness of the underlayer 17 is desired, no less than 1nm is preferable for fully achieving the effect thereof. If it is less than 1 nm, it is difficult to form a continuous film so that the effect of the underlayer 17 itself can not be revealed. On the other hand, if exceeding 20 nm, it is not suitable for the high-density recording.

The combination of the under layer 17, the antiferromagnetization promote layer 19 and the antiferromagnetic layer 50 realizes an excellent temperature characteristic of the exchange coupling magnetic field. Specifically, when actually assembled and operated as an MR head, although a head temperature increases to about 100 to 150° C. (hereinafter referred to as "operating temperature"), deterioration of the exchange coupling magnetic field at this operating temperature becomes quite small. This will be clear through later-described experimental examples.

The material of each layer and the thickness thereof are specified as described above, and an external magnetic field is applied in a direction within the film surface as described later at the film formation time of at least the soft magnetic layer 20 to apply anisotropic magnetic field Hk of 2 to 20 Oe, preferably 2 to 16 Oe, and more preferably 2 to 10 Oe.

If the anisotropic magnetic field Hk of the soft magnetic layer is lower than 2 Oe, it is equal to the same degree of the coercive force, and no linear MR change curve can be substantially obtained in the vicinity of zero magnetic field, so that the characteristic as the MR element is deteriorated.

On the other hand, if it is higher than 20 Oe, when this film is applied to the MR head or the like, the output is liable to be reduced and the resolution is reduced. The value Hk as described above can be obtained by applying the external magnetic field of 10 to 30 Oe at the film formation. If the external magnetic field is no greater than 10 Oe, it is too insufficient to induce Hk. On the other hand, if it exceeds 300 Oe, the effect is not improved although a coil must be designed in large size due to an occurrence of magnetic field. Therefore, the cost is increased and thus it is inefficient.

The magnetic multilayered film 1 may be repetitively laminated to form a magnetoresistance effect film. In this case, the repetitive lamination frequency n of the magnetic multilayered film is not limited to a specific value, and it may be suitably selected in accordance with a desired magnetoresistance ratio, etc. In order to satisfy the present requirement for ultrahigh densification of the magnetic recording, the smaller total film thickness of the magnetic multilayered film is better. However, if the film is thinner, the MR effect is usually reduced. The magnetic multilayered film of this invention can be used in practice to a sufficient level, even when the repetitive lamination frequency n is 1. Furthermore, as the lamination frequency is increased, the magnetoresistance ratio increases while productivity is lowered. If n is excessively large, the resistance of the whole element is excessively low, and it is practically inconvenient. Therefore, usually, n is preferably set to 10 or less. The preferable range of n is 1 to 5.

The film formation of each layer of the foregoing magnetic multilayered film 1 is carried out by sputtering. Upon formation of the magnetic multilayered film 1, particularly, upon formation of the antiferromagnetic layer 50, an ultimate pressure in a vacuum film forming apparatus is set to $2\times10^{-9}$ Torr or less, preferably $8\times10^{-10}$ Torr or less, and more preferably $2\times10^{-10}$ Torr or less. The ultimate pressure is defined as a pressure in the film forming apparatus before the start of film formation, and differs from a pressure upon film formation.

The range of the ultimate pressure of no more than $2\times10^{-9}$ Torr is a range which has not been proposed in view of improving the film quality. For accomplishing the condition of the ultimate pressure of no more than $2\times10^{-9}$ Torr, what is not carried out in general is required with respect to a sputtering apparatus. Specifically, it is necessary that vacuum seal portions be all metal gaskets, that the apparatus be all formed of stainless steel or aluminum, that degassing be carried out at high temperature under vacuum upon assembling the apparatus, that, during exhaust, the whole vacuum vessel be baked to high temperatures so as to thoroughly and forcibly discharge residual gas and $H_2O$, and that an exhaust pump operable under $2\times10^{-9}$ Torr or less be used.

For forming the antiferromagnetic layer 50, the concentration of oxygen contained in a target used in the sputtering is set to 1 to 600 atomic ppm, preferably 1 to 500 atomic ppm, and more preferably 1 to 300 atomic ppm. The oxygen concentration of the target is derived through analysis using the amount of $CO_2$ gas produced by burning a portion of the target. Further, the total concentration of impurities (for example, $H_2O$, $CO_2$ and He) in the sputtering gas introduced upon sputtering is set to 0.1 to 100 atomic ppb, preferably 0.1 to 50 atomic ppb, more preferably 0.1 to 10 atomic ppb, and still more preferably 0.1 to 5 atomic ppb. Particularly, the $H_2O$ impurity concentration in the sputtering gas is liable to influence the film quality and is desired to be set to no more than 40 atomic ppb, preferably no more than 10 atomic ppb, and more preferably no more than 5 atomic ppb. An operating pressure in the vacuum film forming apparatus during actual film formation is normally set to $1\times10^{-4}$ to $1\times10^{-2}$ Torr.

It is preferable that the film formation of the respective layers of the magnetic multilayered film 1 in the present invention is carried out according to the foregoing film forming conditions for further improving the characteristic of the magnetoresistance effect film.

As the substrate 15, glass, silicon, MgO, GaAs, ferrite, AlTiC, $CaTiO_3$ or the like may be used. For the film formation, it is preferable that an external magnetic field of 10 to 300 Oe is applied in one direction within the film plane at the film formation of the soft magnetic layer 20. With this operation, the anisotropic magnetic field Hk can be provided to the soft magnetic layer 20. The application of the external magnetic field may be performed at only the film formation time of the soft magnetic field, for example, using a device which is equipped with an electromagnet or the like which is capable of easily controlling an application timing of the magnetic field, and no external magnetic field is applied at the film formation time of the antiferromagnetic layer 50. Alternatively, a method of applying a constant magnetic field at the film formation time at all times may be used.

As described above, by applying the external magnetic field in one direction within the film plane at least upon film formation of the soft magnetic layer 20 to induce the anisotropic magnetic field Hk, the high frequency characteristic can be further improved.

Furthermore, when forming the antiferromagnetic layer 50, the magnetic field is preferably applied in a direction perpendicular to the direction of the magnetic field applied at the film formation time of the soft magnetic film 20. Specifically, it is applied within the film plane of the magnetic multilayered film and in a direction orthogonal to the measurement current. The magnitude of the applied magnetic field is preferably set in the range of 10 to 300 Oe. With this orthogonalization process carried out in advance, by applying a heat treatment after the formation of the magnetoresistance effect film, the magnetization direction of the ferromagnetic layer 40 is surely fixed in the applied magnetic field direction (direction perpendicular to the measurement current) by the antiferromagnetic layer 50, whereby the magnetization of the ferromagnetic layer can be most reasonably set to be antiparallel to the magnetization of the soft magnetic layer 20 whose direction can be freely changed by the signal magnetic field. However, this is not a necessary condition, and the direction of the magnetic field to be applied at the film formation time of the antiferromagnetic layer may be coincident with the direction of the magnetization of the magnetic field to be applied at the film formation time of the soft magnetic layer. At this time, it is preferable that the temperature is decreased while applying the magnetic field in a strip short-side direction (direction perpendicular to the direction of the applied magnetic field when the soft magnetic layer 20 is formed), when the heat treatment at 150 to 300° C., particularly about 200° C., is carried out in the process after the magnetic multilayered film is formed.

In the present invention, due to the material of the antiferromagnetic layer 50, the exchange coupling between the antiferromagnetic layer 50 and the ferromagnetic layer 40 is not generated upon completion of the formation of the magnetic multilayered film. Therefore, the heat treatment is required after the formation of the magnetic multilayered film for generating the exchange coupling. However, in the present invention, since the antiferromagnetization promote layer 19 made of a particular material is formed so as to abut the antiferromagnetic layer 50, the heat treatment temperature can be set quite lower than the conventional heat treatment temperature. For example, the exchange coupling of a desired magnitude is generated at the heat treatment temperature in the range of no higher than 250° C., particularly 220 to 250° C. Since the exchange coupling can be generated through the heat treatment at the relatively low temperature as described above, a heat damage exerted on the spin valve film itself is extremely small and thus deterioration of the MR ratio being an important film characteristic is extremely small.

Figure 4:
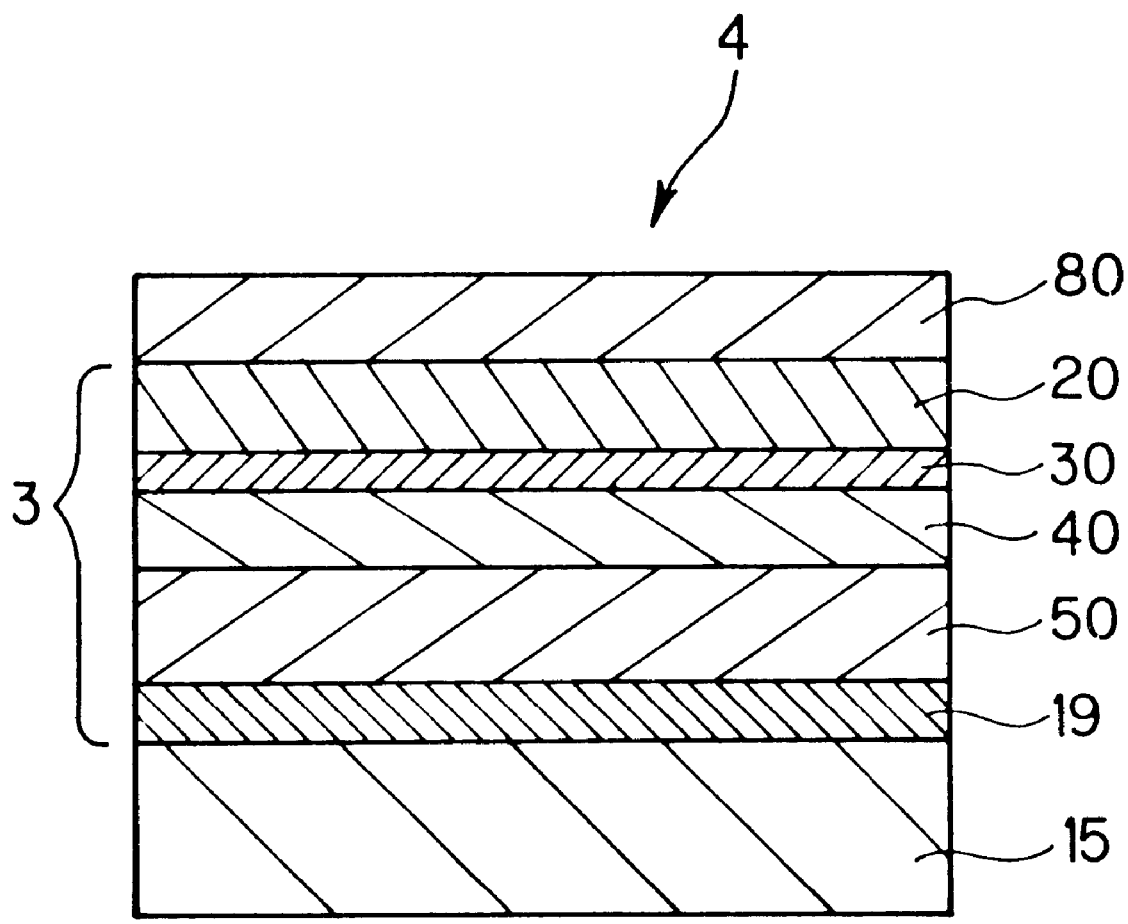
FIG. 4 is a sectional view of a magnetoresistance effect film showing another carrying-out mode of the present invention.

FIG. 4 shows a magnetoresistance effect film according to another carrying-out mode. In the drawing, the same reference numerals as the foregoing reference numerals represent the same constituent members. A magnetoresistance effect film 4 (magnetic multilayered film 3) shown in FIG. 4 differs from the foregoing magnetoresistance effect film 2 (magnetic multilayered film 1) shown in FIG. 1 in that the under layer 17 interposed between the substrate 15 and the antiferromagnetization promote layer 19 is omitted. In this case, since the thickness of the whole magnetoresistance effect film can be reduced, it is suitable for narrowing a gap of the MR head corresponding to the high density magnetic recording.

The magnetoresistance effect film having the magnetic multilayered film as described in each of the foregoing carrying-out modes is applied to a magnetoresistance effect type head (MR head), an MR sensor, a ferromagnetic memory element, an angle sensor or the like.

Hereinbelow, explanation will be given to an example where the magnetoresistance effect film 2 (FIG. 1) is applied to the magnetoresistance effect type head. As the magnetoresistance effect type head in the present invention, a spin valve head having a magnetic multilayered film revealing the giant magnetoresistance effect (GMR) may be cited as a preferred example.

Hereinbelow, the spin valve head will be picked up as the magnetoresistance effect type head (MR head) and given explanation.

Figure 5:
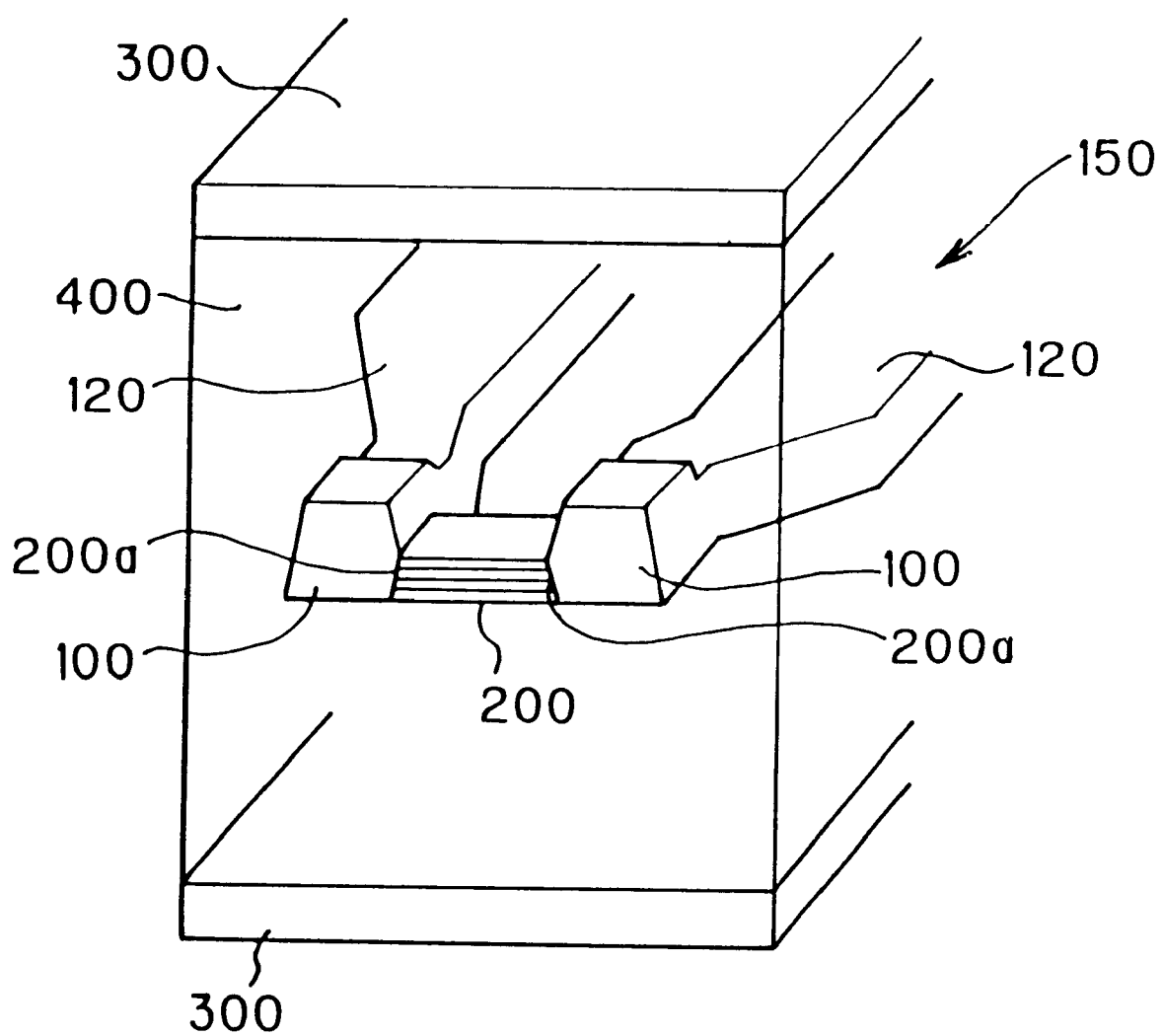
FIG. 5 is a schematic perspective view showing an example of a magnetoresistance effect type head according to the present invention.

As shown in FIG. 5, a magnetoresistance effect type head (MR head) 150 includes a magnetoresistance effect film 200 serving as a magnetically-sensitive portion for magnetically sensing a signal magnetic field, and electrode portions 100, 100 which are formed at both end portions 200a, 200a of the magnetoresistance effect film 200. Preferably, the whole both end portions 200a, 200a of the magnetoresistance effect film 200 serving as the magnetically-sensitive portion are connected to the electrode portions 100, 100. Conductive films 120, 120 are electrically conducted to the magnetoresistance effect film 200 through the electrode portions 100, 100. In this invention, the conductive film 120 and the electrode portion 100 are individually shown to simplify the description which will be made later, while in most cases the conductive film 120 and the electrode portion 100 are formed integral with each other by a thin film forming method. Accordingly, these elements may be considered as being formed of one member.

The magnetoresistance effect film 200 serving as the magnetically-sensitive portion of the MR head has substantially the same laminate structure as the magnetoresistance effect film 2 having the magnetic multilayered film 1 shown in FIG. 1. That is, the magnetoresistance effect film 200 is substantially replaced by the magnetoresistance effect film 2 having the magnetic multilayered film shown in FIG. 1, so that the magnetoresistance effect film 200 includes a non-magnetic metal layer 30, a ferromagnetic layer 40 formed on one surface of the non-magnetic metal layer 30, a soft magnetic layer 20 formed on the other surface of the non-magnetic metal layer 30, an antiferromagnetic layer 50 which is formed on a surface of the ferromagnetic layer 40 remote from the other surface thereof abutting the non-magnetic metal layer 30 so as to pin the direction of magnetization of the ferromagnetic layer 40, and an antiferromagnetization promote layer 19 which is formed on a surface of the antiferromagnetic layer 50 remote from the other surface thereof abutting the ferromagnetic layer 40.

The magnetoresistance effect film 200 exhibits the so-called spin-valve type magnetoresistance change. The spin-value type magnetoresistance change represents that, in the magnetic multilayered film having the non-magnetic metal layer 30, the ferromagnetic layer 40 formed on one surface of the non-magnetic metal layer 30, the soft magnetic layer 20 formed on the other surface of the non-magnetic metal layer 30 and the antiferromagnetic layer 50 formed on the ferromagnetic layer for pinning the magnetization direction of the ferromagnetic layer 40, an angle formed between the spin of the soft magnetic layer 20 and the spin of the pinned ferromagnetic layer 40 is set to approximately 90 degrees in an acute angle when the external signal magnetic field is zero. In practice, the angle may be 45 to 90 degrees, and most preferably 90 degrees (orthogonalization of magnetization) for causing the magnetoresistance effect curve (MR curve) to be asymmetrical relative to the plus and minus external magnetic fields with respect to the zero external magnetic field.

For achieving the orthogonalization of magnetization, it is necessary that the magnetic multilayered film 1 is subjected to a vacuum heat treatment in the magnetic field. This treatment is called an orthogonalization heat treatment, and a temperature during the treatment is called an orthogonalization temperature. In the orthogonalization heat treatment, it is preferable to change only the magnetization direction of the antiferromagnetic layer 50. Preferably, the orthogonalization temperature is lower than a temperature at which the induced magnetic anisotropy of the soft magnetic layer 20 is lost. If the orthogonalization heat treatment is carried out at a temperature higher than the temperature at which the induced magnetic anisotropy of the soft magnetic layer 20 is lost, the magnetization direction of the soft magnetic layer 20 is oriented in a magnetization easy axis direction relative to the external magnetic field so that the magnetoresistance effect curve relative to the external magnetic field is subjected to hysteresis to cause a problem in linearity. Simultaneously, the output is lowered. On the other hand, if it is too lower than the temperature at which the induced magnetic anisotropy of the soft magnetic layer 20 is lost, the exchange coupling magnetic field Hua is deteriorated due to heat applied during operation of an MR sensor in the magnetic recording system and during the spin valve head fabricating process so that the magnetic multilayered film can not work as a spin valve film.

In the present invention, since the antiferromagnetization promote layer 19 made of the particular material is formed so as to abut the antiferromagnetic layer 50 as described above, the exchange coupling can be generated through the heat treatment at the relatively low temperature. Therefore, a heat damage exerted on the spin valve film itself is extremely small and thus deterioration of the MR ratio being an important film characteristic is extremely small.

As shown in FIG. 5, in the magnetoresistance effect type head (MR head) 150, shield layers 300, 300 are formed so as to sandwich the magnetoresistance effect film 200 and the electrode portions 100, 100 at the upper and lower sides, and a non-magnetic insulation layer 400 is formed at a portion between the magnetoresistance effect film 200 and the shield layers 300, 300.

The same materials and thicknesses as described in the foregoing carrying-out mode of the magnetic multilayered film are preferably used for the ferromagnetic layer 40, the non-magnetic metal layer 30, the soft magnetic layer 20, the antiferromagnetic layer 50 and the antiferromagnetization promote layer 19 used in the magnetoresistance effect film 200 as the magnetically-sensitive portion.

As shown in FIG. 5, the current-flowing electrode portions 100 are arranged so that both end portions 200a, 200a of the magnetoresistance effect film 200 are wholly contacted with the electrode portions 100 in the laminate direction of the magnetoresistance effect film 200. Then, the electrons intensively flow through the portion sandwiched between the soft magnetic layer 20 and the ferromagnetic layer 40. At this time, the electrons are magnetically scattered in accordance with the spin directions of the soft magnetic layer 20 and the ferromagnetic layer 40, so that the resistance is greatly varied. Accordingly, a fine change of the external magnetic field can be detected as a large change of electrical resistance.

Figure 6:
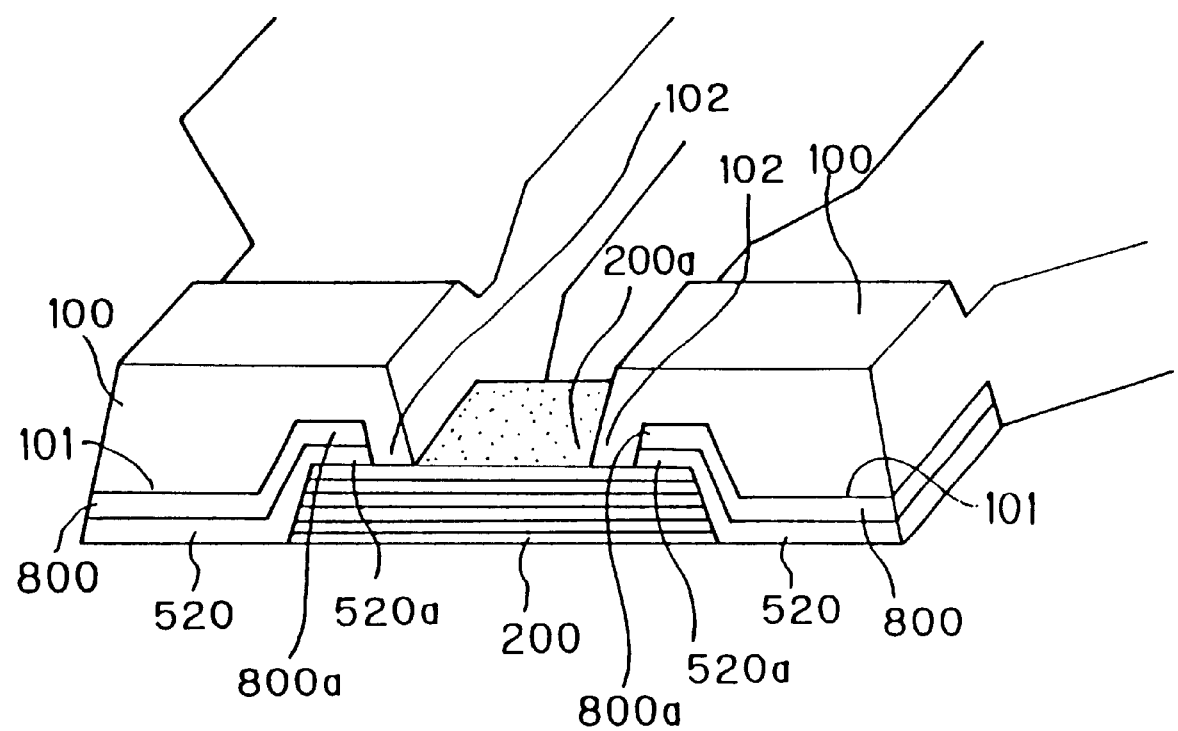
FIG. 6 is a schematic perspective view showing a preferred connection state between a magnetoresistance effect film and electrode portions of a magnetoresistance effect type head according to the present invention.

It is particularly preferable that the MR head having the spin valve film of the present invention has a head structure as shown in FIG. 6. Specifically, between the magnetoresistance effect film 200 working as a magnetically-sensitive portion and the electrode portions 100 for conducting the measurement current, linking soft magnetic layers 520 and antiferromagnetic layers 800 (or hard magnetic layer 800) are interposed in order from the side of the magnetoresistance effect film 200 as shown in the drawing. Further, the linking soft magnetic layer 520 and the antiferromagnetic layer 800 (or hard magnetic layer 800) are formed such that their one end side covers a portion of an upper side 200 a (near the soft magnetic layer) of the magnetoresistance effect film 200 and their other end side gets under a lower surface 101 of the electrode portion 100 as shown in the drawing. Further, an end portion 102, located at the head center side, of the electrode portion 100 is formed so as to cover a portion of the upper side 200 a (near the soft magnetic layer) of the magnetoresistance effect film 200 and also cover upper end portions 520a, 800a of the linking soft magnetic layer 520 and the antiferromagnetic layer 800, respectively. The linking soft magnetic layer 520 is about 10 nm in thickness and made of, for example, NiFe, NiFeCr, NiFeRh, NiFeRu, CoZrNb, FeAlSi and FeZrN. The antiferromagnetic layer 800 is about 50 nm in thickness and made of, for example, $Ru_5Rh_{15}Mn$, NiMn, FeMn, PtMn and $\alpha$-$Fe_2O_3$. The hard magnetic layer 800 is about 50 nm in thickness and made of, for example, CoPt and CoPtCr.

With such an arrangement, through effects of both the linking soft magnetic layers 520 and the antiferromagnetic layers 800 formed at the magnetoresistance effect film 200, the longitudinal bias can be given quite efficiently so that the MR head which can suppress the Barkhausen noises can be achieved. Further, since the end portions 102 of the electrode portions 100 are formed so as to cover the magnetoresistance effect film 200, the MR head can be provided wherein the signal magnetic field is not lowered at the end portions of the element, and further, the formation of narrow track width, such as no greater than 1 $\mu$m, is easy.

The invention of the foregoing magnetoresistance effect film and the invention of the magnetoresistance effect type head using such a magnetoresistance effect film will be explained in further detail based on the following concrete experimental examples:

EXAMPLE I

Samples were prepared using a DC magnetron sputtering apparatus. Specifically, each of the samples was prepared by stacking, on a glass substrate 15, an underlayer 17 (Ta; 5 nm in thickness), an antiferromagnetization promote layer 19 (5 nm in thickness), an antiferromagnetic layer 50 (PtMn; 30 nm in thickness) as a pinning layer, a ferromagnetic layer 40 (Co; 10 nm in thickness), and a protective layer 80 (Ta; 5 nm in thickness) in the order named. In PtMn of the antiferromagnetic layer 50, Mn=49 at %.

The samples were prepared with compositions of the antiferromagnetization promote layers using various materials shown in Table 1 below. In Table 1, La represents a lattice constant (unit: Å) in the (111) crystal orientation surface of the antiferromagnetic layer 50 (PtMn), and Lp represents a lattice constant (unit: Å) in the closest packed surface of the antiferromagnetization promote layer 19.

After preparation of the samples, a heat treatment was applied thereto in the magnetic field under various heat treatment conditions shown in Table 1. After completion of the heat treatment, a magnetization curve of each sample was measured, and a magnitude of the exchange coupling between the antiferromagnetic layer and the ferromagnetic layer was evaluated in the following manner. Further, after completion of the heat treatment, an X-ray profile of each sample was measured so as to examine the crystal orientation surface of the antiferromagnetic layer 50.

Figure 7:
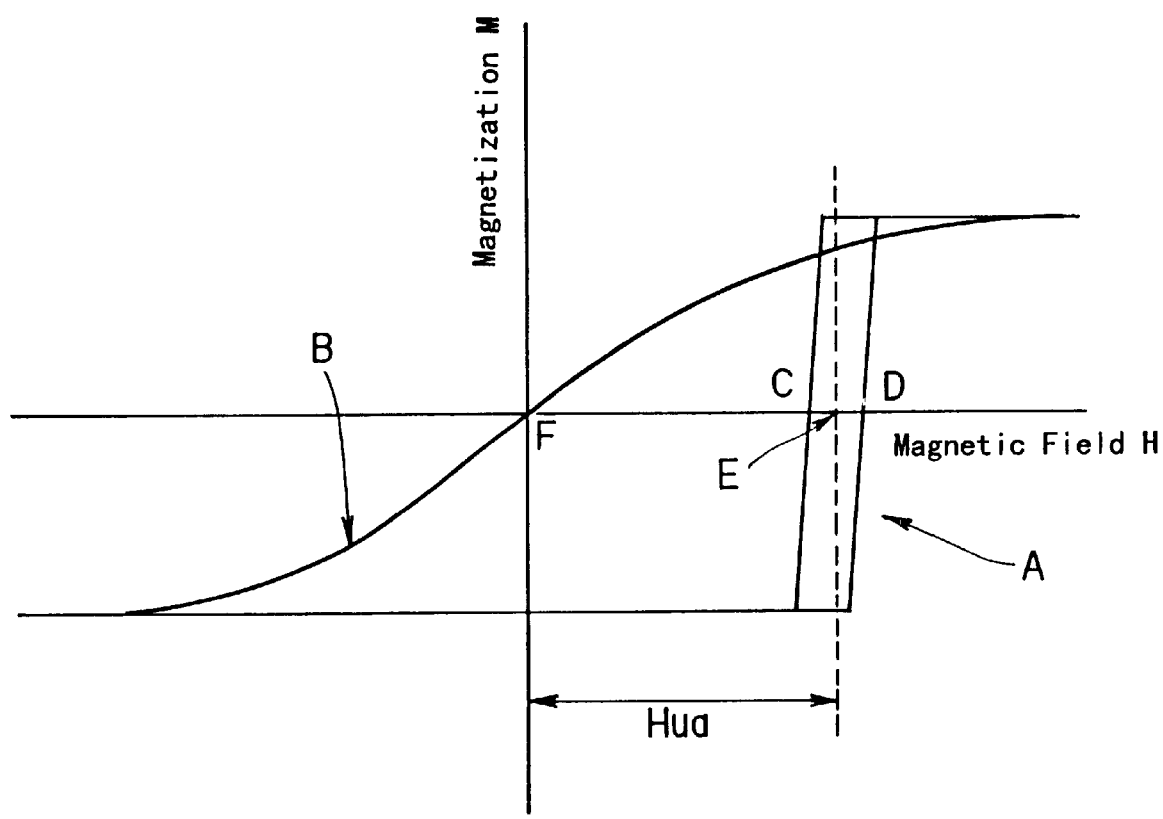
FIG. 7 is a diagram showing an M-H loop according to the present invention.

(1) Exchange Coupling Magnetic Field Hua due to Exchange Coupling and Exchange Coupling Energy Jk The exchange coupling magnetic field Hua is defined, for example, as a magnetic field at point E (middle point between point C and point D) shifting from the origin F in a magnetization curve shown in FIG. 7. In the drawing, a magnetization curve A represents a magnetization easy axis direction (direction in which the magnetic field was applied upon heat treatment), while a magnetization curve B represents a magnetization hard axis direction.

The exchange coupling energy Jk is derived by an equation Jk=Ms·Hua·d, wherein Ms represents a saturation magnetization of the ferromagnetic layer, and d represents a thickness of the ferromagnetic layer. Assuming that the ferromagnetic layers to be pinned are made of the same material and have the same thickness, the shift magnetic field Hua increases as a value of Jk increases so that an operation of the MR head becomes stable.

(2) Crystal Orientation Surface of Antiferromagnetic Layer 50

Figure 10:
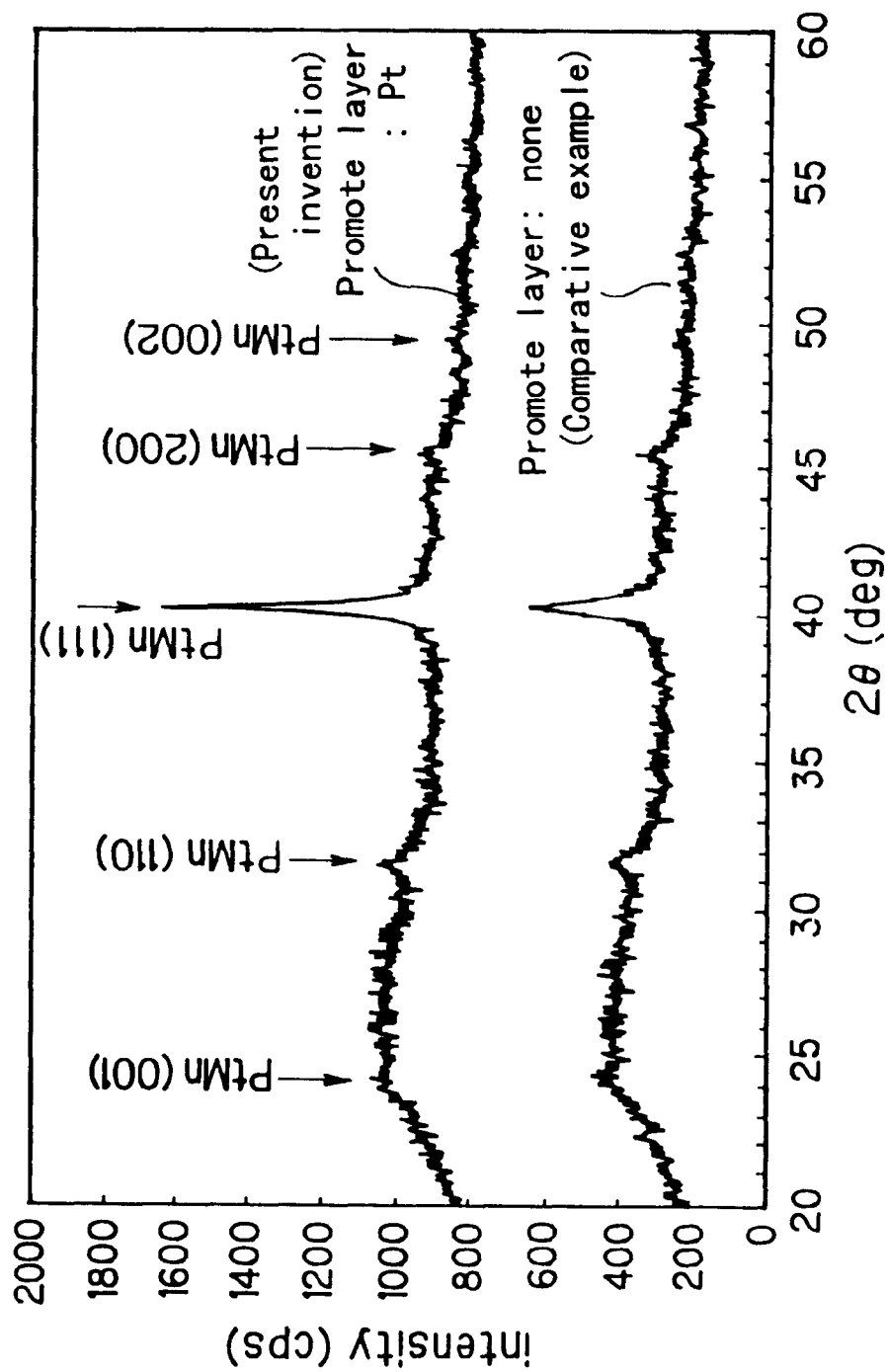
FIG. 10 is a graph showing an example of an X-ray profile measurement chart.

After completion of the heat treatment, an X-ray profile of each sample was measured to examine the crystal orientation surface of the antiferromagnetic layer 50. In the present invention, it is necessary that the crystals be oriented on the (111) crystal orientation surface. An example of measurement chart of X-ray profiles is shown in FIG. 10. In the example of FIG. 10, PtMn was used as the antiferromagnetic layer, and Pt was used as the antiferromagnetization promote layer. In FIG. 10, it can be confirmed that the peak intensity is extremely high in the vicinity of 2θ=40 deg. in the antiferromagnetic layer of the present invention so that the orientation is achieved on the (111) crystal orientation surface.

The results are shown in Table 1.

TABLE 1

| (antiferromagnetic layer: PtMn (La = 2.72Å)) | | | | | | |
|---|---|---|---|---|---|---|
| Antiferro- | Heat treatment condition | | | Regular crystal orientation surface of anti- | | Jk |
| magnetization promote layer | Temp (C.°) | Time (hour) | Lp/La | ferromagnetic layer | Hua (Oe) | (erg/cm²) |
| None | 220 | 5 | — | no orientation | 148 | 0.174 |
|  | 250 | 5 | — | no orientation | 198 | 0.232 |
|  | 280 | 5 | — | no orientation | 283 | 0.332 |
| Pt (Lp = 2.77Å) | 220 | 5 | 1.02 | (111) | 208 | 0.245 |
|  | 250 | 5 | 1.02 | (111) | 256 | 0.301 |
|  | 280 | 5 | 1.02 | (111) | 306 | 0.360 |

TABLE 1-continued (antiferromagnetic layer: PtMn (La = 2.72Å))

| Antiferro-magnetization promote layer | Heat treatment condition Temp (C.°) | Time (hour) | Lp/La | Regular crystal orientation surface of antiferromagnetic layer | Hua (Oe) | Jk (erg/cm²) |
|---|---|---|---|---|---|---|
| Pd      | 220 | 5 | 1.01 | (111) | 201 | 0.237 |
| (Lp = 2.75Å) | 250 | 5 | 1.01 | (111) | 253 | 0.298 |
|         | 280 | 5 | 1.01 | (111) | 302 | 0.355 |
| Ir      | 220 | 5 | 1.00 | (111) | 177 | 0.209 |
| (Lp = 2.71Å) | 250 | 5 | 1.00 | (111) | 243 | 0.286 |
|         | 280 | 5 | 1.00 | (111) | 290 | 0.341 |
| Rh      | 220 | 5 | 0.99 | (111) | 195 | 0.230 |
| (Lp = 2.68Å) | 250 | 5 | 0.99 | (111) | 246 | 0.289 |
|         | 280 | 5 | 0.99 | (111) | 266 | 0.312 |
| Re      | 220 | 5 | 1.01 | (111) | 189 | 0.223 |
| (Lp = 2.73Å) | 250 | 5 | 1.01 | (111) | 237 | 0.279 |
|         | 280 | 5 | 1.01 | (111) | 299 | 0.351 |
| Ru      | 220 | 5 | 0.97 | (111) | 176 | 0.207 |
| (Lp = 2.64Å) | 250 | 5 | 0.97 | (111) | 217 | 0.256 |
|         | 280 | 5 | 0.97 | (111) | 285 | 0.335 |
| Os      | 220 | 5 | 0.98 | (111) | 171 | 0.201 |
| (Lp = 2.67Å) | 250 | 5 | 0.98 | (111) | 225 | 0.265 |
|         | 280 | 5 | 0.98 | (111) | 256 | 0.301 |
| PtRh    | 220 | 5 | 1.01 | (111) | 203 | 0.239 |
| (Lp = 2.74Å) | 250 | 5 | 1.01 | (111) | 250 | 0.294 |
|         | 280 | 5 | 1.01 | (111) | 288 | 0.339 |
| Cu      | 220 | 5 | 0.94 | (111) | 168 | 0.198 |
| (Lp = 2.55Å) | 250 | 5 | 0.94 | (111) | 242 | 0.285 |
|         | 280 | 5 | 0.94 | (111) | 294 | 0.346 |
| Ag      | 220 | 5 | 1.06 | (111) | 175 | 0.206 |
| (Lp = 2.88Å) | 250 | 5 | 1.06 | (111) | 235 | 0.276 |
|         | 280 | 5 | 1.06 | (111) | 280 | 0.329 |
| Au      | 220 | 5 | 1.06 | (111) | 177 | 0.208 |
| (Lp = 2.88Å) | 250 | 5 | 1.06 | (111) | 217 | 0.255 |
|         | 280 | 5 | 1.06 | (111) | 285 | 0.335 |
| Al      | 220 | 5 | 1.05 | (111) | 163 | 0.192 |
| (Lp = 2.86Å) | 250 | 5 | 1.05 | (111) | 228 | 0.268 |
|         | 280 | 5 | 1.05 | (111) | 263 | 0.309 |
| Comparative example Hf | 220 | 5 | 1.15 | (111) | 150 | 0.176 |
|         | 250 | 5 | 1.15 | (111) | 205 | 0.241 |
| (Lp = 3.14Å) | 280 | 5 | 1.15 | (111) | 272 | 0.320 |
| Comparative example Cr | 220 | 5 | 0.92 | no orientation | 145 | 0.171 |
|         | 250 | 5 | 0.92 | no orientation | 196 | 0.231 |
| (Lp = 2.49Å) | 280 | 5 | 0.92 | no orientation | 264 | 0.311 |
| Comparative example Zr | 220 | 5 | 1.16 | no orientation | 151 | 0.178 |
|         | 250 | 5 | 1.16 | no orientation | 193 | 0.227 |
| (Lp = 3.16Å) | 280 | 5 | 1.16 | no orientation | 252 | 0.296 |

From the results shown in Table 1, it is seen that, in case of the compositions of the antiferromagnetic layers 50 being PtMn, the samples formed with the antiferromagnetization promote layers of the present invention have acquired values of the exchange coupling energy Jk being no less than 0.2 erg/cm² through the heat treatment at the relatively low temperature of 220° C. Particularly, it is seen that, in case of using the antiferromagnetization promote layer made of Pt, the exchange coupling energy exceeds 0.24 erg/cm², thus revealing a quite excellent effect. Following this, it is seen that the antiferromagnetization promote layer made of Pd, PtRh or Rh which can achieve the exchange coupling energy of no less than 0.23 erg/cm² is excellent. The reason why a criterion for judging the value of the exchange coupling energy Jk is set to no less than 0.2 erg/cm² is to ensure sufficiently large exchange coupling between the antiferromagnetic layer 50 and the ferromagnetic layer 40 so as to guarantee a sufficient quality characteristic when assembled as a head.

EXAMPLE II

Samples were prepared using a DC magnetron sputtering apparatus. Specifically, each of the samples was prepared by stacking, on a glass substrate 15, an underlayer 17 (Ta; 5 nm in thickness), an antiferromagnetization promote layer 19 (5 nm in thickness), an antiferromagnetic layer 50 (NiMn; 30 nm in thickness) as a pinning layer, a ferromagnetic layer 40 (Co; 10 nm in thickness), and a protective layer 80 (Ta; 5 nm in thickness) in the order named. In NiMn of the antiferromagnetic layer 50, Mn=55 at %.

The samples were prepared with compositions of the antiferromagnetization promote layers using various materials shown in Table 2 below. In Table 2, La represents a lattice constant (unit: Å) in the (111) crystal orientation surface of the antiferromagnetic layer 50 (NiMn), and Lp represents a lattice constant (unit: Å) in the closest packed surface of the antiferromagnetization promote layer 19.

After preparation of the samples, a heat treatment was applied thereto in the magnetic field under various heat treatment conditions shown in Table 2. After completion of the heat treatment, a magnetization curve of each sample was measured, and a magnitude of the exchange coupling between the antiferromagnetic layer and the ferromagnetic layer was evaluated in the same manner as that in the foregoing Example I. Further, after completion of the heat treatment, an X-ray profile of each sample was measured in the same manner as that in the foregoing Example I so as to examine the crystal orientation surface of the antiferromagnetic layer 50.

The results are shown in Table 2.

TABLE 2

(antiferromagnetic layer: NiMn (La = 2.57Å))

| Antiferro-magnetization promote layer | Heat treatment condition Temp (C.°) | Time (hour) | Lp/La | Regular crystal orientation surface of antiferromagnetic layer | Hua (Oe) | Jk (erg/cm²) |
|---|---|---|---|---|---|---|
| None    | 220 | 5 | —    | no orientation | 130 | 0.153 |
|         | 250 | 5 | —    | no orientation | 170 | 0.200 |
|         | 280 | 5 | —    | no orientation | 191 | 0.225 |
| Pt      | 220 | 5 | 1.08 | (111) | 173 | 0.203 |
| (Lp = 2.77Å) | 250 | 5 | 1.08 | (111) | 205 | 0.241 |
|         | 280 | 5 | 1.08 | (111) | 240 | 0.282 |
| Pd      | 220 | 5 | 1.07 | (111) | 180 | 0.212 |
| (Lp = 2.75Å) | 250 | 5 | 1.07 | (111) | 211 | 0.248 |
|         | 280 | 5 | 1.07 | (111) | 236 | 0.278 |
| Ir      | 220 | 5 | 1.05 | (111) | 180 | 0.212 |
| (Lp = 2.71Å) | 250 | 5 | 1.05 | (111) | 199 | 0.234 |
|         | 280 | 5 | 1.05 | (111) | 222 | 0.261 |
| Rh      | 220 | 5 | 1.05 | (111) | 192 | 0.226 |
| (Lp = 2.68Å) | 250 | 5 | 1.05 | (111) | 211 | 0.248 |
|         | 280 | 5 | 1.05 | (111) | 250 | 0.294 |
| Re      | 220 | 5 | 1.06 | (111) | 163 | 0.192 |
| (Lp = 2.73Å) | 250 | 5 | 1.06 | (111) | 184 | 0.216 |
|         | 280 | 5 | 1.06 | (111) | 200 | 0.235 |
| Ru      | 220 | 5 | 1.03 | (111) | 165 | 0.194 |
| (Lp = 2.64Å) | 250 | 5 | 1.03 | (111) | 180 | 0.212 |
|         | 280 | 5 | 1.03 | (111) | 199 | 0.234 |
| Os      | 220 | 5 | 1.04 | (111) | 169 | 0.199 |
| (Lp = 2.67Å) | 250 | 5 | 1.04 | (111) | 190 | 0.223 |
|         | 280 | 5 | 1.04 | (111) | 203 | 0.239 |
| PtRh    | 220 | 5 | 1.07 | (111) | 174 | 0.205 |
| (Lp = 2.74Å) | 250 | 5 | 1.07 | (111) | 206 | 0.242 |
|         | 280 | 5 | 1.07 | (111) | 233 | 0.274 |
| Comparative example Ag | 220 | 5 | 1.12 | (111) | 157 | 0.185 |
|         | 250 | 5 | 1.12 | (111) | 190 | 0.223 |
| (Lp = 2.88Å) | 280 | 5 | 1.12 | (111) | 212 | 0.249 |
| Comparative example Au | 220 | 5 | 1.12 | (111) | 145 | 0.171 |
|         | 250 | 5 | 1.12 | (111) | 194 | 0.228 |
| (Lp = 2.88Å) | 280 | 5 | 1.12 | (111) | 208 | 0.245 |

TABLE 2-continued (antiferromagnetic layer: NiMn (La = 2.57Å))

| Antiferro-magnetization promote layer | Heat treatment condition Temp (C.°) | Time (hour) | Lp/La | Regular crystal orientation surface of antiferromagnetic layer | Hua (Oe) | Jk (erg/cm$^2$) |
|---|---|---|---|---|---|---|
| Comparative example Al (LP = 2.86Å) | 220 | 5 | 1.11 | (111) | 142 | 0.167 |
| | 250 | 5 | 1.11 | (111) | 185 | 0.218 |
| | 280 | 5 | 1.11 | (111) | 201 | 0.236 |
| Comparative example Cr (Lp = 2.49Å) | 220 | 5 | 0.97 | no orientation | 129 | 0.152 |
| | 250 | 5 | 0.97 | no orientation | 165 | 0.194 |
| | 280 | 5 | 0.97 | no orientation | 200 | 0.235 |
| Comparative example Zr (Lp = 3.16Å) | 220 | 5 | 1.23 | no orientation | 135 | 0.159 |
| | 250 | 5 | 1.23 | no orientation | 178 | 0.209 |
| | 280 | 5 | 1.23 | no orientation | 199 | 0.234 |

From the results shown in Table 2, it is seen that, in case of the compositions of the antiferromagnetic layers 50 being NiMn, the samples formed with the antiferromagnetization promote layers of the present invention have acquired values of the exchange coupling energy Jk being no less than 0.19 erg/cm$^2$ through the heat treatment at the relatively low temperature of 220° C. Particularly, it is seen that, in case of using the antiferromagnetization promote layer made of Rh, the exchange coupling energy exceeds 0.22 erg/cm$^2$, thus revealing a quite excellent effect. Following this, it is seen that the antiferromagnetization promote layer made of Pd which can achieve the exchange coupling energy exceeding 0.21 erg/cm$^2$ is excellent, and subsequently, it is seen that the antiferromagnetization promote layer made of PtRh or Pt which can achieve the exchange coupling energy of no less than 0.20 erg/cm$^2$ is excellent.

EXAMPLE III

With respect to the results of the foregoing Example I, particularly, the compositions Pt, Pd, PtRh and Rh of the antiferromagnetization promote layers achieving the preferable results, an experiment was performed to examine an influence of the film thickness. Specifically, samples were prepared using a DC magnetron sputtering apparatus, each prepared by stacking, on a glass substrate 15, an underlayer 17 (Ta; 5 nm in thickness), an antiferromagnetization promote layer 19, an antiferromagnetic layer 50 (PtMn; 30 nm in thickness) as a pinning layer, a ferromagnetic layer 40 (Co; 10 nm in thickness), and a protective layer 80 (Ta; 5 nm in thickness) in the order named.

The compositions and thicknesses of the antiferromagnetization promotelayers were as shown in Table 3 below.

After preparation of the samples, an annealing process was applied thereto in the magnetic field under a heat treatment condition of 220° C.-5 hours. After completion of the heat treatment, a magnetization curve of each sample was measured, and a magnitude of the exchange coupling between the antiferromagnetic layer and the ferromagnetic layer was evaluated in the same manner as the foregoing.

The results are show in Table 3.

TABLE 3

(antiferromagnetic layer: PtMn)

| Antiferromagnetization promote layer | Promote layer thickness (nm) | Hua (Oe) | Jk (erg/cm$^2$) |
|---|---|---|---|
| Pt | 0 | 148 | 0.174 |
| | 1 | 205 | 0.241 |
| | 5 | 208 | 0.245 |
| | 10 | 210 | 0.247 |
| Pd | 0 | 148 | 0.174 |
| | 1 | 200 | 0.235 |
| | 5 | 201 | 0.237 |
| | 10 | 205 | 0.241 |
| PtRh | 0 | 148 | 0.174 |
| | 1 | 195 | 0.230 |
| | 5 | 203 | 0.239 |
| | 10 | 208 | 0.245 |
| Rh | 0 | 148 | 0.174 |
| | 1 | 193 | 0.227 |
| | 5 | 195 | 0.230 |
| | 10 | 200 | 0.235 |

From the results shown in Table 3, it is seen that the thickness of the antiferromagnetization promote layer is preferably 1 to 10 nm. If the thickness becomes less than 1 nm, the film formation control and the measurement accuracy with respect to the thickness can not be sufficient so that considerable dispersion occurs in the measurement. However, as a result of studying the large amount of accumulated data, it was confirmed that a sufficient effect could be expected up to the thickness lower limit of about 0.1 nm. It was further confirmed that those samples with no under layers 17 made of Ta could achieve the results similar to those in Table 3.

EXAMPLE IV

With respect to the results of the foregoing Example II, particularly, the compositions Rh, Pd, Pt and PtRh of the antiferromagnetization promote layers achieving the preferable results, an experiment was performed to examine an influence of the film thickness. Specifically, samples were prepared using a DC magnetron sputtering apparatus, each prepared by stacking, on a glass substrate 15, an underlayer 17 (Ta; 5 nm in thickness), an antiferromagnetization promote layer 19, an antiferromagnetic layer 50 (NiMn; 30 nm in thickness) as a pinning layer, a ferromagnetic layer 40 (Co; 10 nm in thickness), and a protective layer 80 (Ta; 5 nm in thickness) in the order named.

The compositions and thicknesses of the antiferromagnetization promote layers were as shown in Table 4 below.

After preparation of the samples, an annealing process was applied thereto in the magnetic field under a heat treatment condition of 220° C.-5 hours. After completion of the heat treatment, a magnetization curve of each sample was measured, and a magnitude of the exchange coupling between the antiferromagnetic layer and the ferromagnetic layer was evaluated in the same manner as the foregoing.

The results are shown in Table 4.

TABLE 4

(antiferromagnetic layer: NiMn)

| Antiferromagnetization promote layer | Promote layer thickness (nm) | Hua (Oe) | Jk (erg/cm$^2$) |
|---|---|---|---|
| Rh | 0 | 130 | 0.153 |
|  | 1 | 177 | 0.208 |
|  | 5 | 192 | 0.226 |
|  | 10 | 188 | 0.221 |
| Pd | 0 | 130 | 0.153 |
|  | 1 | 170 | 0.200 |
|  | 5 | 180 | 0.212 |
|  | 10 | 177 | 0.208 |
| Pt | 0 | 130 | 0.153 |
|  | 1 | 170 | 0.200 |
|  | 5 | 173 | 0.203 |
|  | 10 | 175 | 0.206 |
| PtRh | 0 | 130 | 0.153 |
|  | 1 | 166 | 0.195 |
|  | 5 | 174 | 0.205 |
|  | 10 | 177 | 0.208 |

From the results shown in Table 4, it is seen that the thickness of the antiferromagnetization promote layer is preferably 1 to 10 nm. If the thickness becomes less than 1 nm, the film formation control and the measurement accuracy with respect to the thickness can not be sufficient so that considerable dispersion occurs in the measurement. However, as a result of studing the large amount of accumulated data, it was confirmed that a sufficient effect could be expected up to the thickness lower limit of about 0.1 nm. It was further confirmed that those samples with no under layers 17 made of Ta could achieve the results similar to those in Table 4.

EXAMPLE V

A spin valve (SV) type magnetoresistance effect type head was prepared as shown in FIG. 6.

First, a spin valve type magnetoresistance effect film was prepared. Specifically, the film sample was prepared by stacking, on a substrate 15 (AlTiC with $Al_2O_3$), an underlayer 17 (Ta; 5 nm in thickness), an antiferromagnetization promote layer 19 (Pt; 5 nm in thickness), an antiferromagnetic layer 50 (PtMn; 30 nm in thickness) as a pinning layer, a ferromagnetic layer 40 (Co; 10 nm in thickness), a non-magnetic metal layer 30 (Cu; 2.5 nm in thickness), a soft magnetic layer 20 (NiFe; 7 nm in thickness) and a protective layer 80 (Ta; 5 nm in thickness) in the order named, so as to prepare the magnetoresistance effect type head.

In this magnetoresistance effect type head, an upper shield layer and a lower shield layer were formed via an $Al_2O_3$ gap film.

In this magnetoresistance effect type head, an MR head portion as shown in FIG. 6 was formed. Specifically, NiFe was formed to have a thickness of 10 nm as linking soft magnetic layers 520, and then, $Ru_5Rh_{15}Mn_{20}$ was formed on the linking soft magnetic layers 520 to have a thickness of 10 nm as antiferromagnetic layers 800. Thereafter, electrode portions 100 made of Ta were further formed on the antiferromagnetic layers 800 so that the spin valve (SV) type magnetoresistance effect type head was prepared as shown in FIG. 7. Subsequently, in vacuum of $10^{-7}$ Torr, the head was cooled from 220° C. while applying a magnetic field of 500 Oe in an in-plane direction perpendicular to a measurement current direction, so as to induce the pinning effect for the ferromagnetic layer (heat treatment for exchange coupling).

A track width of the magnetoresistance effect type head was set to 2 μm, while a height of the MR element was set to 1 μm and a sense current was set to 4 mA.

Using this magnetoresistance effect type head sample No. V-1, the MR ratio and the head output voltage were examined. As a result, the MR ratio of 7.8% and the head output voltage of 3.0 mV were confirmed. This head output is a very large value which is about 1.5 times the normal spin valve head.

Following the magnetoresistance effect type head sample No. V-1, magnetoresistance effect type head samples were prepared by changing materials of under layers and antiferromagnetization promote layers as shown in Table 5. With respect to these samples, MR ratios and head output voltages were measured. The results are shown in Table 5.

TABLE 5

(antiferromagnetic layer: PtMn (La = 2.72Å))

| Sample No. | Under layer | Antiferromagnetization promote layer | Lp/La | Regular crystal orientation surface of antiferromagnetic layer | MR ratio (%) | Head output (mV) |
|---|---|---|---|---|---|---|
| V-1 | Ta | Pt | 1.02 | (111) | 7.8 | 3.0 |
| V-2 | Ta | Rh | 0.99 | (111) | 8.0 | 3.2 |
| V-3 | Hf | Rh | 0.99 | (111) | 8.2 | 3.4 |
| V-4 | Zr | Rh | 0.99 | (111) | 8.0 | 3.1 |
| V-5 | Ti | Rh | 0.99 | (111) | 8.1 | 3.0 |
| V-6 | Ta | Re | 1.01 | (111) | 8.1 | 3.3 |
| V-7 | Hf | Re | 1.01 | (111) | B.3 | 3.5 |
| V-8 | Ta | Pd | 1.01 | (111) | 8.0 | 3.1 |
| V-9 | Hf | Pd | 1.01 | (111) | 8.3 | 3.3 |
| V-10 | Hf | Pt | 1.02 | (111) | 7.9 | 3.1 |
| V-11 | Ta | Cu | 0.94 | (111) | 7.3 | 2.8 |
| V-12 | — | Rh | 0.99 | (111) | 7.2 | 2.7 |
| V-13* | Ta | — | — | no orientation | 6.2 | 2.1 |

*: represents a comparative sample.

Figure 11:
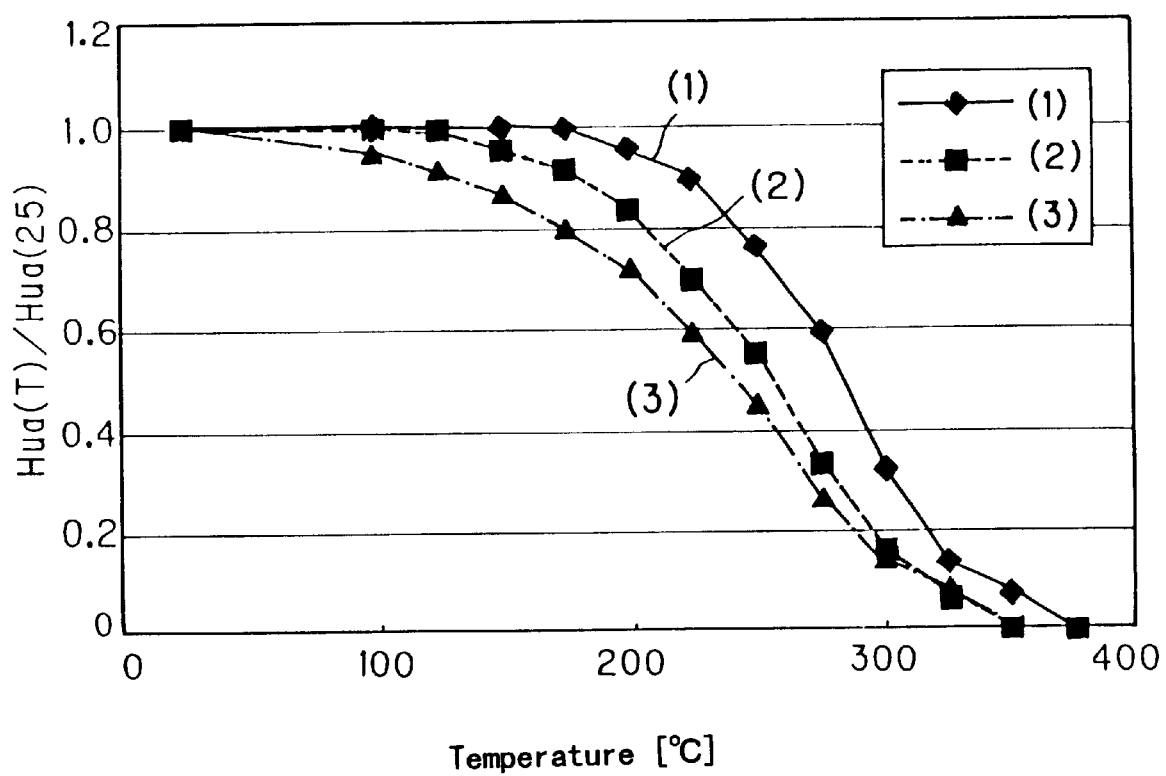
FIG. 11 is a graph showing exchange coupling magnetic field temperature characteristics.

Further, temperature characteristics of the exchange coupling magnetic fields were examined with respect to the sample No. V-2 (under layer: Ta, antiferromagnetization promote layer: Rh), the sample No. V-12 (under layer: none, antiferromagnetization promote layer: Rh) and the comparative sample No. V-13 (under layer: Ta, antiferromagnetization promote layer: none) and shown in a graph of FIG. 11. In FIG. 11, the axis of abscissa represents the temperature of a sample (spin valve film), while the axis of ordinate represents the coupling magnetic field Hua(T) of a sample at each temperature in terms of a ratio (Hua(T)/Hua(25)) relative to the coupling magnetic field Hua(25) at a room temperature of 25° C. A graph curve of the sample No. V-2 is identified by symbol (1), a graph curve of the sample No. V-12 by symbol (2), and a graph curve of the sample No. V-13 by symbol (3). The head (spin valve film) temperature in an actual operating environment becomes about 100 to 150° C. Particularly in such a temperature range, it is preferable that the value of Hua(T)/Hua(25) is as close to 1 as possible. That is, such a spin valve film is preferable wherein the coupling magnetic field Hua does not change even if the head temperature increases. When observing the graph of FIG. 11 from this aspect, the temperature characteristic of the exchange coupling magnetic field of the sample No. V-2 identified by symbol (1) is the most preferable. With respect to the samples Nos. V-1 and V-3 to V-11, graph curves similar to the graph curve (1) of the sample No. V-2 were obtained. As seen from these results, the spin valve films having the under layer materials, the antiferromagnetization promote layer materials and the antiferromagnetic layer materials as taught by the present invention are quite excellent in temperature characteristic of exchange coupling magnetic field and in heat resistance in the actual operating environment.

EXAMPLE VI

A spin valve (SV) type magnetoresistance effect type head sample No. VI-1 was prepared like the magnetoresistance effect type head sample No. V-1 of the foregoing Example V except that the antiferromagnetization promote layer was changed to Rh and the antiferromagnetic layer 50 as a pinning layer was changed to NiMn. Using this magnetoresistance effect type head sample No. VI-1, the MR ratio and the head output voltage were examined. As a result, the MR ratio of 6.3% and the head output voltage of 3.0 mV were confirmed. This head output is a very large value which is about 1.5 times the normal spin valve head.

Following the magnetoresistance effect type head sample No. VI-1, magnetoresistance effect type head samples were prepared by changing materials of underlayers and antiferromagnetization promote layers as shown in Table 6. With respect to these samples, MR ratios and head output voltages were measured. The results are shown in Table 6.

TABLE 6

(antiferromagnetic layer: NiMn (La = 2.57Å))

| Sample No. | Under layer | Antiferro-magnetiza-tion promote layer | Lp/La | Regular crystal orientation surface of anti-ferromagnetic layer | MR ratio (%) | Head output (mV) |
|---|---|---|---|---|---|---|
| VI-1 | Ta | Rh | 1.05 | (111) | 6.3 | 3.0 |
| VI-2 | Hf | Rh | 1.05 | (111) | 6.4 | 3.2 |
| V-3 | Zr | Rh | 1.05 | (111) | 6.2 | 3.0 |
| VI-4 | Ti | Rh | 1.05 | (111) | 6.4 | 2.9 |
| VI-5 | Ta | Ir | 1.05 | (111) | 6.1 | 3.0 |
| VI-6 | Hf | Ir | 1.05 | (111) | 6.2 | 2.8 |
| VI-7 | Ta | Pt | 1.08 | (111) | 6.6 | 3.0 |
| VI-8 | Ta | Pd | 1.07 | (111) | 5.8 | 2.7 |
| VI-9 | Hf | Pd | 1.07 | (111) | 6.0 | 2.7 |
| VI-10 | — | Rh | 1.05 | (111) | 5.7 | 2.4 |
| VI-11* | Ta | — | — | (111) | 5.0 | 1.8 |

*: represents a comparative sample.

Further, temperature characteristics of the exchange coupling magnetic fields were examined with respect to the sample No. VI-1 (under layer: Ta, antiferromagnetization promote layer: Rh), the sample No. VI-10 (underlayer: none, antiferromagnetization promote layer: Rh) and the comparative sample No. VI-11 (underlayer: Ta, antiferromagnetization promote layer: none). As a result, the tendency similar to the graph of FIG. 11 was observed, and it was confirmed that the temperature characteristic of the exchange coupling magnetic field of the sample No. VI-1 was the most preferable. With respect to the samples Nos. VI-2 to VI-9, it was confirmed that excellent temperature characteristics of the exchange coupling magnetic fields could be obtained like the sample No. VI-1. As seen from these results, the spin valve films having the underlayer materials, the antiferromagnetization promote layer materials and the antiferromagnetic layer materials as taught by the present invention are quite excellent in temperature characteristic of exchange coupling magnetic field and in heat resistance in the actual operating environment.

EXAMPLE VII

Figure 8:
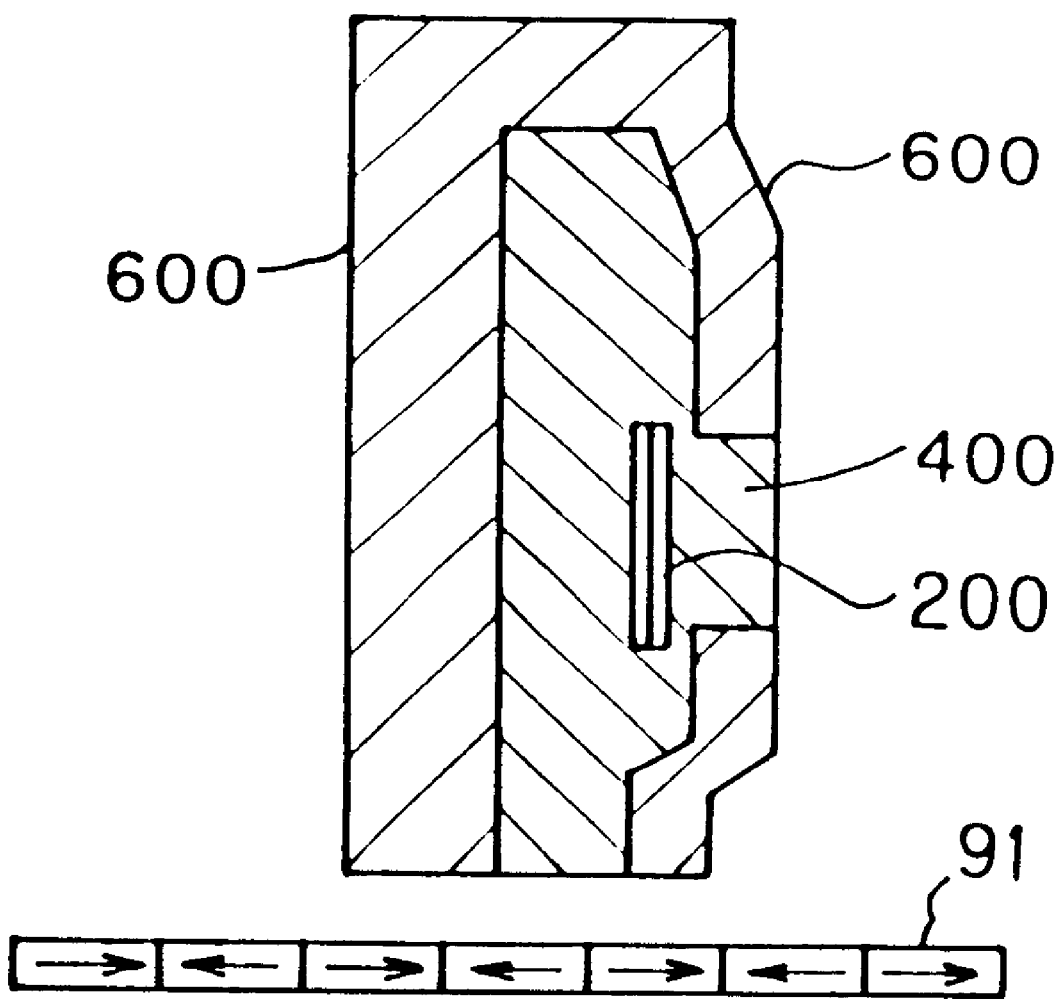
FIG. 8 is a partially omitted sectional view showing an example, wherein a magnetoresistance effect film (magnetic multilayered film) according to the present invention is applied to a yoke-type MR head.

FIG. 8 shows an example in which the magnetoresistance effect film of the present invention is applied to a yoke-type MR head. In this example, a cutout is formed at a portion of yokes 600, 600, and a magnetoresistance effect film 200 is formed therebetween via a thin insulation film 400. The magnetoresistance effect film 200 is provided with electrodes (not shown) for feeding a current in a direction parallel to or perpendicular to a magnetic path formed by the yokes 600, 600.

EXAMPLE VIII

Figure 9:
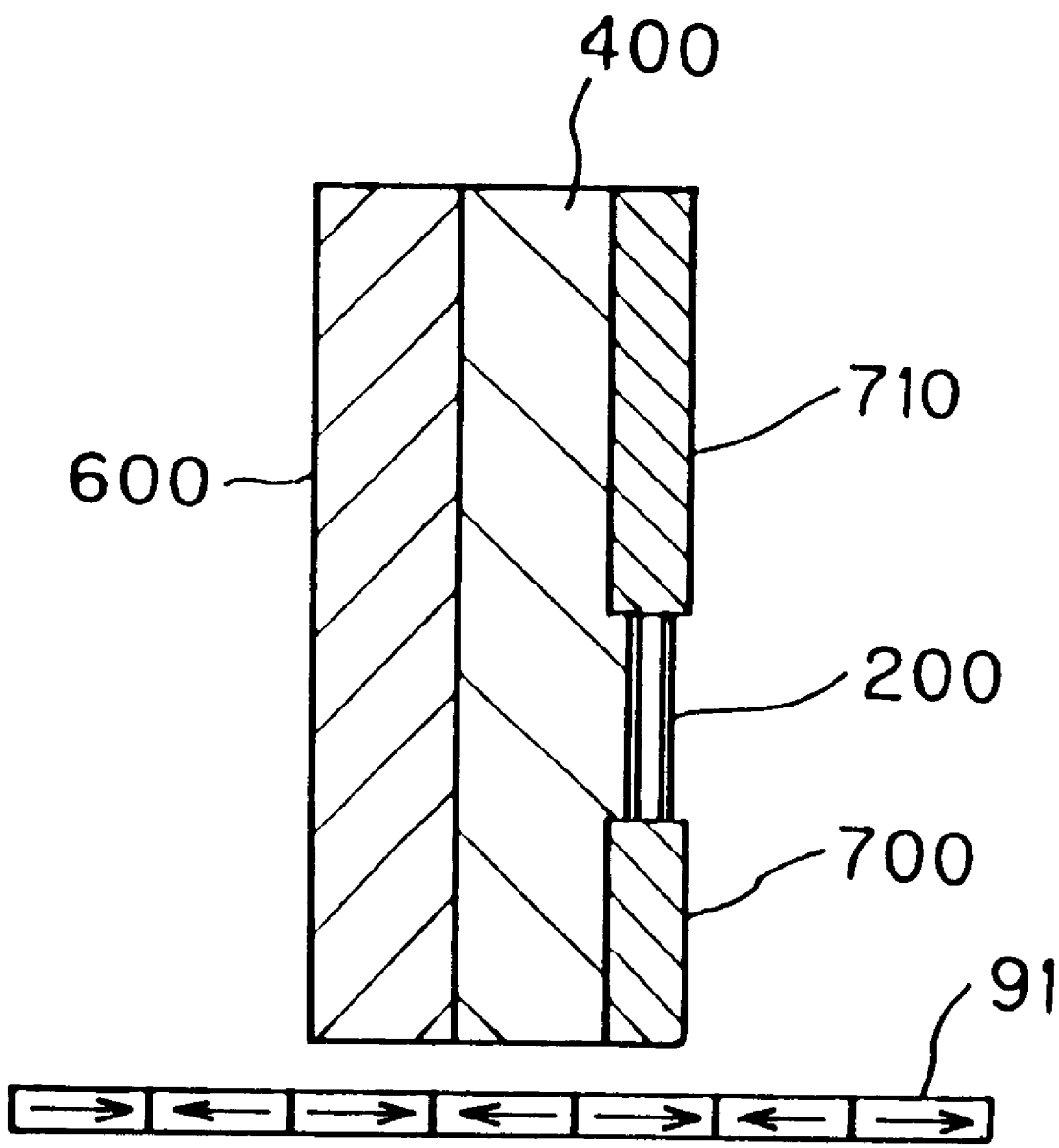
FIG. 9 is a partially omitted sectional view showing an example, wherein a magnetoresistance effect film (magnetic multilayered film) according to the present invention is applied to a flux guide type MR head.

FIG. 9 shows an example in which the magnetoresistance effect film of the present invention is applied to a flux guide type MR head. In this example, a magnetoresistance effect film 200 is magnetically coupled to flux guide layers 700 and 710 of high resistivity and high permeability. The flux guide layers 700 and 710 indirectly conduct a signal magnetic field to the magnetoresistance effect film 200. Further, via a non-magnetic insulation layer 400, a flux back guide layer 600 (escape path for magnetic flux passing the magnetoresistance effect film 200) is formed. Flux back guide layers 600 may be provided at both sides the magnetoresistance effect film 200 via the non-magnetic insulation layer 400. A feature of this head resides in that a magnetic field detecting portion thereof can approximate a recording medium in a nearly abutting fashion so that the high output can be obtained.

As appreciated from the foregoing results, the effect of the present invention is clear. Specifically, the present invention is arranged such that, in the spin valve type magnetoresistance effect film, the antiferromagnetization promote layer is formed on a surface of the antiferromagnetic layer remote from a surface thereof abutting the ferromagnetic layer, the antiferromagnetic layer is made of a compound containing Mn and having a CuAu—I type regular crystal structure, the antiferromagnetic layer has a characteristic requiring a heat treatment for generating the exchange coupling relative to the ferromagnetic layer, the antiferromagnetic layer after the heat treatment is oriented on the (111) crystal orientation surface, and the ratio Lp/La of a lattice constant Lp in the closest packed surface of the antiferromagnetization promote layer relative to a lattice constant La in the (111) crystal orientation surface of the antiferromagnetic layer is in the range of 0.9 to 1.1.

Accordingly, the regulating temperature of the antiferromagnetic layer can be lowered so that the exchange coupling to the ferromagnetic layer can be generated at a heat treatment temperature as low as possible (for example, no higher than 250° C.). The thus obtained spin valve film is subjected to only quite small deterioration of spin valve film characteristics (for example, MR ratio).

What is claimed is:
1. A spin valve type magnetoresistance effect film comprising a multilayered film including
   a non-magnetic metal layer,
   a ferromagnetic layer formed on one surface of the non-magnetic metal layer,
   a soft magnetic layer formed on the other surface of said non-magnetic metal layer,
   an antiferromagnetic layer which is formed on a surface of said ferromagnetic layer remote from a surface thereof abutting said non-magnetic metal layer so as to pin a direction of magnetization of said ferromagnetic layer, and
   an antiferromagnetic promote layer formed on a surface of said antiferromagnetic layer remote from a surface thereof abutting said ferromagnetic layer,
   wherein said ferromagnetic layer is in direct contact with said antiferromagnetic layer, and said antiferromagnetic layer is in direct contact with said antiferromagnetic promote layer, wherein said antiferromagnetic layer is made of a compound containing Mn and having a CuAu—I type regular crystal structure, said antiferromagnetic layer has a characteristic requiring a heat treatment for generating exchange coupling relative to said ferromagnetic layer, and said antiferromagnetic layer after said heat treatment is oriented on a (111) crystal orientation surface, and wherein a ratio Lp/La of a lattice constant Lp in a closest packed surface of said antiferromagnetization promote layer relative to a lattice constant La in the (111) crystal orientation surface of said antiferromagnetic layer is in the range of 0.9 to 1.1.

2. The magnetoresistance effect film according to claim 1, wherein said antiferromagnetic layer oriented on the (111) crystal orientation surface is made of PtMn or an alloy containing PtMn at least no less than 80 at %, and wherein said antiferromagnetization promote layer is made of at least one selected from Ir, Pd, Pt, Rh, Ru, Re, Os, Al, Cu, Au and Ag.

3. The magnetoresistance effect film according to claim 2, wherein said antiferromagnetization promote layer is made of at least one selected from Pd, Pt, Rh and Re.

4. The magnetoresistance effect film according to claim 1, wherein said antiferromagnetic layer oriented on the (111) crystal orientation surface is made of NiMn or an alloy containing NiMn at least no less than 80 at %, and wherein said antiferromagnetization promote layer is made of at least one selected from Ir, Pd, Pt, Rh, Ru, Re and Os.

5. The magnetoresistance effect film according to claim 4, wherein said antiferromagnetization promote layer is made of at least one selected from Ir, Pd and Rh.

6. The magnetoresistance effect film according to claim 1, wherein a thickness of said antiferromagnetization promote layer is 0.1 to 10 nm.

7. The magnetoresistance effect film according to claim 1, wherein a laminate structure is formed by said antiferromagnetization promote layer, said antiferromagnetic layer, said ferromagnetic layer, said non-magnetic metal layer and said soft magnetic layer which are stacked in the order named on a substrate directly or via an underlayer.

8. The magnetoresistance effect film according to claim 1, wherein a laminate structure is formed by said antiferromagnetization promote layer, said antiferromagnetic layer, said ferromagnetic layer, said non-magnetic metal layer and said soft magnetic layer which are stacked in the order named on an under-layer formed on a substrate, and wherein said underlayer is made of at least one selected from Ta, Hf, Zr and Ti.

9. A magnetoresistance effect type head comprising a magnetoresistance effect film, conductive films and electrode portions, wherein said conductive films are conductively connected to said magnetoresistance effect film through said electrode portions, wherein said magnetoresistance effect film is a spin valve type magnetoresistance effect film which comprises a multilayered film including a non-magnetic metal layer, a ferromagnetic layer formed on one surface of the non-magnetic metal layer, a soft magnetic layer formed on the other surface of said non-magnetic metal layer, an antiferromagnetic layer which is formed on a surface of said ferromagnetic layer remote from a surface thereof abutting said non-magnetic metal layer so as to pin a direction of magnetization of said ferromagnetic layer, and an antiferromagnetization promote layer formed on a surface of said antiferromagnetic layer remote from a surface thereof abutting said ferromagnetic layer, wherein said ferromagnetic layer is in direct contact with said antiferromagnetic layer, and said antiferromagnetic layer is in direct contact with said antiferromagnetic promote layer, wherein said antiferromagnetic layer is made of a compound containing Mn and having a CuAu—I type regular crystal structure, said antiferromagnetic layer has a characteristic requiring a heat treatment for generating exchange coupling relative to said ferromagnetic layer, and said antiferromagnetic layer after said heat treatment is oriented on a (111) crystal orientation surface, and wherein a ratio Lp/La of a lattice constant Lp in a closest packed surface of said antiferromagnetization promote layer relative to a lattice constant La in the (111) crystal orientation surface of said antiferromagnetic layer is in the range of 0.9 to 1.1.

10. The magnetoresistance effect type head according to claim 9, wherein said antiferromagnetic layer oriented on the (111) crystal orientation surface is made of PtMn or an alloy containing PtMn at least no less than 80 at %, and wherein said antiferromagnetization promote layer is made of at least one selected from Ir, Pd, Pt, Rh, Ru, Re, Os, Al, Cu, Au and Ag.

11. The magnetoresistance effect type head according to claim 10, wherein said antiferromagnetization promote layer is made of at least one selected from Pd, Pt, Rh and Re.

12. The magnetoresistance effect type head according to claim 9, wherein said antiferromagnetic layer oriented on the (111) crystal orientation surface is made of NiMn or an alloy containing NiMn at least no less than 80 at %, and wherein said antiferromagnetization promote layer is made of at least one selected from Ir, Pd, Pt, Rh, Ru, Re and Os.

13. The magnetoresistance effect type head according to claim 12, wherein said antiferromagnetization promote layer is made of at least one selected from Ir, Pd and Rh.

14. The magnetoresistance effect type head according to claim 9, wherein a thickness of said antiferromagnetization promote layer is 0.1 to 10 nm.

15. The magnetoresistance effect type head according to claim 9, wherein said magnetoresistance effect film comprises a laminate structure formed by said antiferromagnetization promote layer, said antiferromagnetic layer, said ferromagnetic layer, said non-magnetic metal layer and said soft magnetic layer which are stacked in the order named on a substrate directly or via an underlayer.

16. The magnetoresistance effect type head according to claim 9, wherein said magnetoresistance effect film comprises a laminate structure formed by said antiferromagnetization promote layer, said antiferromagnetic layer, said ferromagnetic layer, said non-magnetic metal layer and said soft magnetic layer which are stacked in the order named on an underlayer formed on a substrate, and wherein said under layer is made of at least one selected from Ta, Hf, Zr and Ti.

17. A spin valve type magnetoresistance effect film comprising a multilayered film including, in order, a soft magnetic layer a non-magnetic layer, a ferromagnetic layer, an antiferromagnetic layer, and an antiferromagnetization promote layer, wherein
    said soft magnetic layer is in direct contact with said non-magnetic layer,
    said non-magnetic layer is in direct contact with said ferromagnetic layer,
    said ferromagnetic layer is in direct contact with said antiferromagnetic layer, and
    said antiferromagnetic layer is in direct contact with said antiferromagnetization promote layer;
wherein said antiferromagnetic layer is made of a compound containing Mn and having a CuAu—I type regular crystal structure, said antiferromagnetic layer has a characteristic requiring a heat treatment for generating exchange coupling relative to said ferromagnetic layer, and said antiferromagnetic layer after said heat treatment is oriented on a (111) crystal orientation surface, and
wherein a ratio Lp/La of a lattice constant Lp in a closest packed surface of said antiferromagnetization promote layer relative to a lattice constant La in the (111) crystal orientation surface of said antiferromagnetic layer is in the range of 0.9 to 1.1.

* * * * *